(12) United States Patent
Schmaelzle et al.

(10) Patent No.: US 8,742,250 B2
(45) Date of Patent: Jun. 3, 2014

(54) STATIONARY SUNLIGHT REDIRECTING SYSTEM FOR INCREASING THE EFFICIENCY OF FIXED-TILT PV FARM

(75) Inventors: Philipp H. Schmaelzle, Los Altos, CA (US); Matthew D. Eisaman, Redwood City, CA (US); Patrick Y. Maeda, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 526 days.

(21) Appl. No.: 12/853,252

(22) Filed: Aug. 9, 2010

(65) Prior Publication Data

US 2012/0031463 A1 Feb. 9, 2012

(51) Int. Cl.
*H01L 31/042* (2014.01)
*H01L 31/00* (2006.01)

(52) U.S. Cl.
USPC .......................................... 136/246; 136/259

(58) Field of Classification Search
CPC .......................................................... F24J 2/06
USPC ................................................. 136/243–265
See application file for complete search history.

(56) References Cited

U.S. PATENT DOCUMENTS

| 4,411,493 | A | | 10/1983 | Miller | |
|---|---|---|---|---|---|
| 4,612,913 | A | * | 9/1986 | Mori | 126/606 |
| 4,773,733 | A | | 9/1988 | Murphy, Jr. et al. | |
| 5,802,784 | A | | 9/1998 | Federmann | |
| 2004/0007260 | A1 | * | 1/2004 | Dinwoodie | 136/251 |
| 2010/0000165 | A1 | * | 1/2010 | Koller | 52/173.3 |
| 2011/0120524 | A1 | | 5/2011 | Wares et al. | |

FOREIGN PATENT DOCUMENTS

| JP | 61165702 A | | 7/1986 |
|---|---|---|---|
| WO | WO2008028677 | * | 3/2008 |

* cited by examiner

*Primary Examiner* — Jeffrey T Barton
*Assistant Examiner* — Niki Bakhtiari
(74) *Attorney, Agent, or Firm* — Bever, Hoffman & Harms, LLP; Patrick T. Bever

(57) ABSTRACT

A low-cost system for increasing the electricity generation of flat panel photovoltaic (PV) farms in which sunlight redirecting elements are positioned in offset spaces provided between adjacent panel assemblies and serve to redirect otherwise unused sunlight onto solar cells disposed on one of the panel assemblies. The redirecting elements are located in a prismatic volume bounded at its upper end by an inclined upper plane that extends across the offset space separating adjacent PV panel assemblies. The redirecting elements are either mounted to at least one of the PV panel assemblies, or placed on the ground between the assemblies. Each redirecting element includes multiple reflecting and/or refracting surfaces that utilize a disclosed microoptical arrangement (e.g., focus and steer or reorient and scatter) to distribute the redirected sunlight in a substantially homogenous (uniform) distribution on the solar cells.

18 Claims, 10 Drawing Sheets

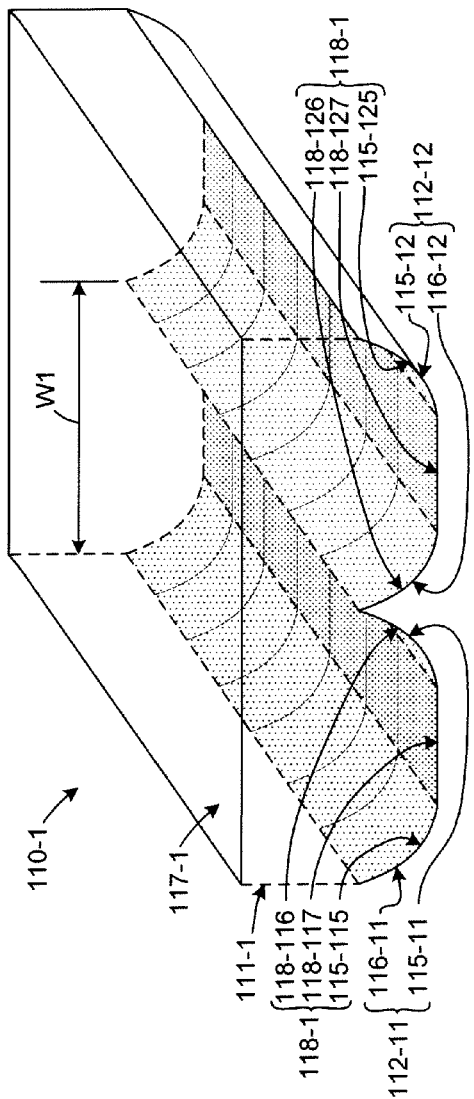
FIG. 6
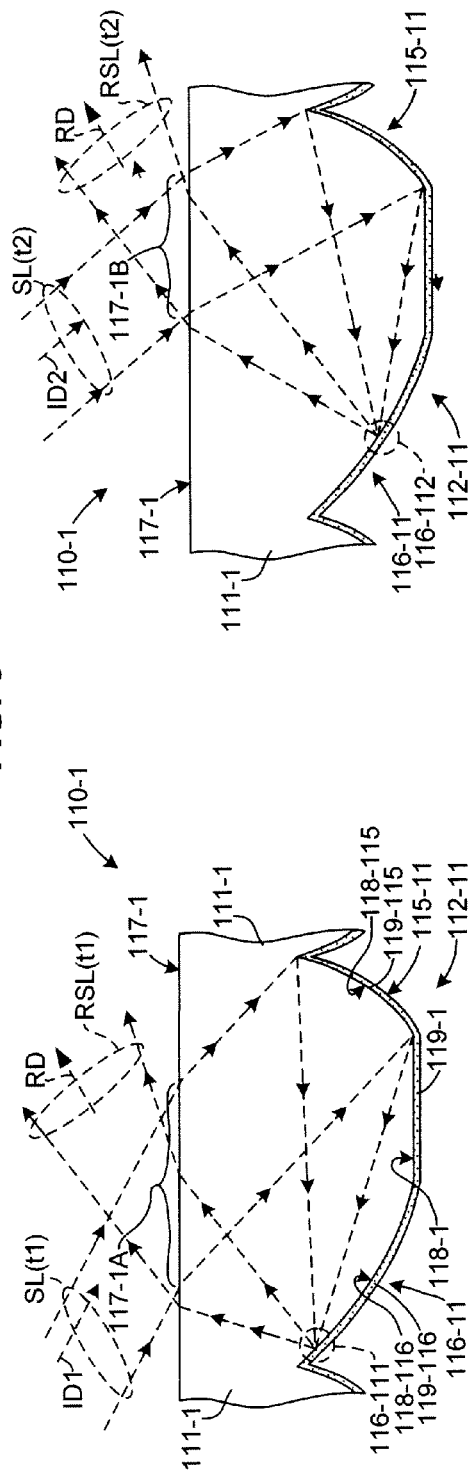
FIG. 7(A)
FIG. 7(B)

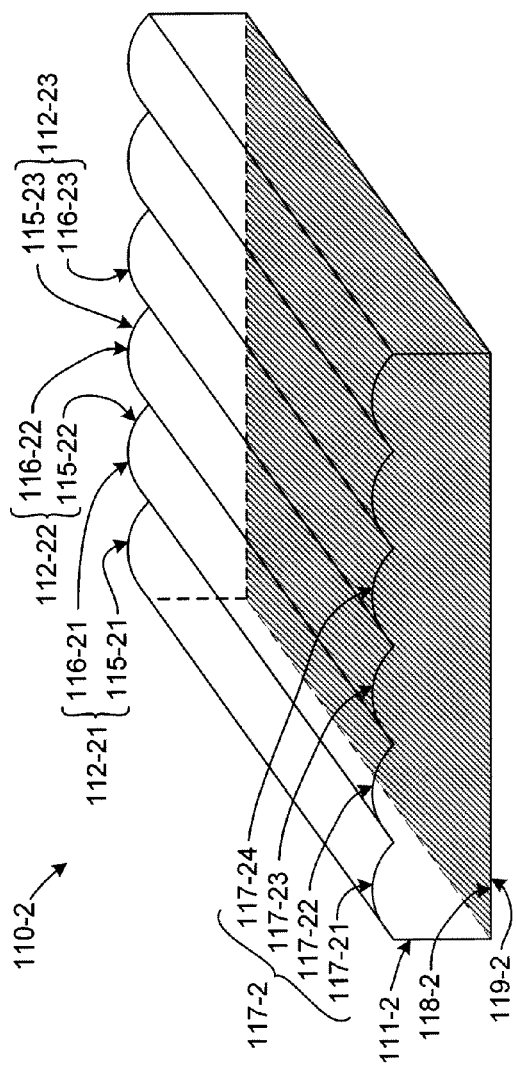
FIG. 8
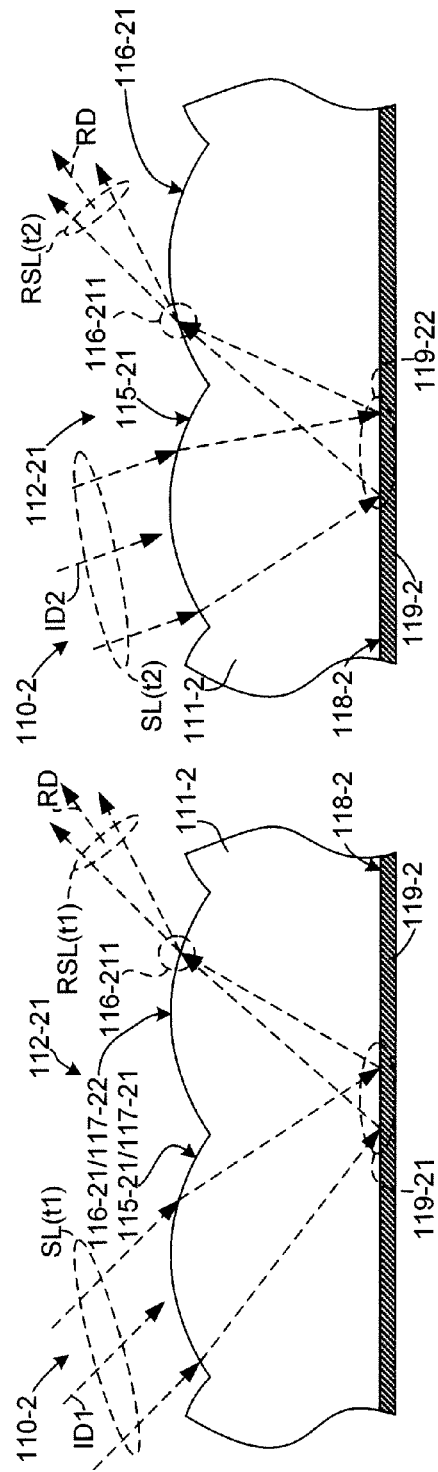
FIG. 9(A)
FIG. 9(B)

STATIONARY SUNLIGHT REDIRECTING SYSTEM FOR INCREASING THE EFFICIENCY OF FIXED-TILT PV FARM

FIELD OF THE INVENTION

The present invention is directed to a low-cost system for increasing the electricity generation of fixed-tilt photovoltaic (PV) farms, and more particularly to a system in which low-cost sunlight redirecting elements are positioned to distribute otherwise unused sunlight onto flat panel solar modules in fixed-tilt PV farms in a substantially uniform pattern.

BACKGROUND OF THE INVENTION

PV farms are power stations that utilize large numbers of solar photovoltaic (PV) cells to convert sunlight into electricity on a commercial scale. Many such PV farms having power production in the range of 40 MW to 60 MW have already been built, mainly in Europe and the United States, and PV farms having capacities of up to 1 GW or more are being proposed. As the amount of power generated by such PV farms increases, it will become more and more desirable to utilize technologies that increase each PV farm's output by even a few percent.

FIGS. 12 and 13 illustrate portions of a typical fixed-tilt PV farm 50, which represents one PV farm type that is currently being used for commercial solar power generation. Fixed-tilt PV farms are characterized by having flat-panel solar PV modules that are maintained in a fixed position that is inclined (tilted) relative to the ground in order to maximize the capture of sunlight. FIG. 12 is a top perspective view showing three exemplary PV panel assemblies 60-1, 60-2 and 60-3, where each panel assembly 60-1, 60-2 and 60-3 includes an associated group of solar cell panels 65-11 to 65-16, 65-21 to 65-26 and 65-31 to 65-36 that are arranged in a lengthwise direction L in a desired "fixed-tilt" arrangement. Each of the solar cell panels 65-11 to 65-16, 65-21 to 65-26 and 65-31 to 65-36 includes multiple flat panel solar cells 80 that are maintained in a flat (planar) arrangement by a suitable panel structure (e.g., a plate of glass to which solar cells 80 are attached). Panel assemblies 60-1, 60-2 and 60-3 are spaced at a predetermined offset spacing (pitch) P for reasons described below, and are maintained in the desired "fixed-tilt" arrangement by a corresponding support structure 70-1, 70-2 and 70-3. In the present example, each support structure (e.g., support structure 70-3) includes a base 71 that serves to support a panel support structure 72 at an inclined angle θ relative to substantially level ground G, where panel support structure 72 supports panels 65-31 to 65-36. For descriptive purposes, panel support structure 72 includes an upper (horizontal) edge 73, a lower edge 74, and opposing left and right side edges 75 and 76, although outer edges of panels 65-31 to 65-36 may define these structure edges in some embodiments. Solar cells 80 are thus supported by and maintained in a planar array by a corresponding panel support structure 72 such that solar cells 80 are disposed over substantially all of the available surface of each frame 72 (i.e., the area bounded by upper edge 73, lower edge 74 and side edges 75 and 76). On each panel assembly 60-1, 60-2 and 60-3, solar cells 80 are electrically series-connected according to known techniques.

FIG. 13 is a simplified side elevation view showing PV panels 60-1 and 60-2 of PV farm 50, showing situations at noon time of various days for simplicity. The tilt angle θ is selected according to the latitude of the installation, to optimize the total amount of sunlight intercepted during the year. Typical tilt angle values are in the range of 0.7 to 1.0 times the latitude at which the PV farm is installed. As mentioned above, most fixed-tilt PV farms are and will be installed in the mid term future in latitudes between 25 and 60 degrees away from the equator, since this coincides with geographical regions of good insulation providing power availability and strong economic activity creating power demand. This observation allows to limit the analysis and design to this range of latitudes, thereby simplifying the task at hand. At these latitudes, the sunlight beams $SL_E$ are directed at a predictable angle at the vernal and autumnal equinox, and varies around this direction as shown between sunlight beams $SL_{WS}$ having a relatively shallow angle $-\Delta$ ($=23.5$ degrees) at the winter solstice, and sunlight beams $SL_{SS}$ having a relatively steep angle $+\Delta$ at the summer solstice. Note that the active surface R formed by solar cells 80 of each panel (e.g., panel 60-1) defines a planar surface A. By knowing the incident angle of sunlight during the course of a year, fixed inclined angle θ can be selected to maximize the total amount of solar radiation captured by solar cells 80 during the course of a year. For example, as indicated in FIG. 13, inclined angle θ of PV panel 60-2 may be set such that sunlight beams $SL_E$ are normal to the active surface of solar cells 80A (i.e., such that solar cells 80A are optimally positioned to convert received sunlight during the equinox periods) in order to maximize the solar radiation captured during a twelve month period.

FIG. 13 also illustrates the required offset spacing (pitch) P for PV farms constructed at a given latitude. As mentioned above, solar cells 80 of each PV panel 60-1 and 60-2 are series-connected, and therefore it is important for maximum total power generation by each panel that each solar cell 80 produces a substantially equal amount of power. In order for this to occur, each solar cell 80 must receive the same amount of sunlight, and shading of any of the solar cells must be avoided. In particular, as indicated in FIG. 13, at the winter solstice, sunlight beams $SL_{WS}$ must pass over upper edge 74-1 of solar panel 60-1 without casting a shadow on the lower-most solar cells 80A of panel 60-2. To achieve this homogenous illumination of all solar cells, solar panels 60-1 and 60-2 must be separated by offset spacing P.

Depending on latitude and exact solar farm layout, a yearly aggregate of between approximately 30 and 80 percent more sunlight is available within the footprint of a standard fixed-tilt PV farm than is actually intercepted by the photovoltaic panels. This is due to the conservative offset spacing P typically employed with electrically series-connected modules, which pose a strong requirement for homogenous illumination (i.e., as explained above, each solar cell 80 must receive substantially the same amount of light in order to maintain optical power generation). The extra sunlight would normally be absorbed unused in the space between the panels. For example, as indicated in FIG. 13, summer solstice sunlight beams $SL_{SS1}$, $SL_{SS2}$ and $SL_{SS3}$ are indicated as passing directly onto ground G between panels 60-1 and 60-2, which illustrates a large amount of sunlight is not received by solar cells 80 during summer in order to provide homogenous illumination during winter.

What is needed is a low-cost system for increasing the electricity generation efficiency of flat panel PV farms. Making use of the unused "wasted" sunlight is very valuable because PV cells have a very linear current versus irradiance response around their design point. What is also needed is a passive sunlight redirecting element for use in such a system that distributes redirected sunlight in a substantially uniform manner.

SUMMARY OF THE INVENTION

The present invention is directed to a low-cost stationary sunlight redirecting system for increasing the efficiency of a fixed-tilt, flat panel PV farm in which a sunlight redirecting element is fixedly secured in the offset space separating adjacent PV panel assemblies, whereby the redirecting element redirects otherwise "wasted" sunlight onto an adjacent PV panel assembly in a substantially homogenous pattern (i.e., such that all of the solar cells receive substantially the same amount of redirected sunlight). The present invention is most effectively utilized at latitudes in the range of 23 and 67 degrees (north or south), where relatively large required offset spacing between adjacent fixed-tilt panel assemblies provides significant otherwise "wasted" sunlight during the summer months. By redirecting this otherwise "wasted" sunlight entering the space between the panel assemblies during at least a portion of the year (e.g., at least in summer), the present invention serves to increase the efficiency of a fixed-tilt, flat panel PV farm on an annual basis by 5 to 10% or more.

According to an aspect of the present invention, each redirecting element includes a base and multiple substantially identical redirecting structures uniformly arranged and fixedly disposed on the base, where each redirecting structure includes two or more microoptical surface regions (e.g., reflective, refractive, or scattering surfaces disposed in either planar or curved arrangements) that are cooperatively formed and arranged such that at least some of the sunlight is transmitted between the two or more corresponding optical surface regions and then toward the target PV panel assembly. By providing each redirecting element with multiple redirecting structures, where each redirecting structure includes two or more optical surface regions arranged in this manner, the present invention provides a stationary sunlight redirecting system that redirects sunlight to the target PV panel assembly in a homogenous manner even when the sunlight's incident direction changes over time. That is, because each redirecting structure utilizes multiple microoptical surface regions to redirect the sunlight, the redirecting structures of the present invention are able to redirect the sunlight along a substantially fixed path to the target PV panel assembly when the sunlight's incident angle changes over time, thereby avoiding the need to use an expensive mechanism that tracks the sun's position and moves the redirecting element in order to optimize the position of the redirecting structures relative to the target PV panel assembly.

According to another aspect of the present invention, each redirecting element is located in a prismatic "design space" volume defined by the unused space separating adjacent PV panel assemblies. In one embodiment, the prismatic "design space" is defined at its upper end by an inclined upper plane that extends across the otherwise unused space separating the adjacent PV panel assemblies (i.e., a plane extending between the upper edge of the first PV panel assembly and the lower edge of the target (second) PV panel assembly). Locating the redirecting element below this upper plane prevents undesirable shading of the target PV panel assembly, e.g., during winter months when the incident sunlight is received at a shallow angle. In a specific embodiment the prismatic volume is further bounded by a front plane, a rear plane, and the ground disposed between the adjacent PV panel assemblies. The front plane extends between the ground and the lower edge of the solar cells mounted on the second PV panel assembly, and is inclined at an angle defined by the active surface of the second PV panel assembly's solar cells. Locating the redirecting element behind this front plane facilitates redirection of sunlight onto the second PV panel assembly's solar cells second PV panel assembly at an effective angle. The rear plane extends between ground and the upper edge of the first panel assembly, the rear plane being inclined at an angle defined by the expected sunlight direction at noon on the summer solstice. Locating the redirecting element in front of this rear plane facilitates directing sunlight onto the redirecting element (i.e., locating the redirecting element behind the rear plane would prevent the element from receiving direct sunlight, even in summer). In one specific embodiment, each redirecting element is positioned within an associated prismatic volume such that the redirecting element receives and redirects sunlight during 70% of the year.

According to an aspect of the present invention, each redirecting element remains fixed relative to a target PV panel assembly at all times by way of a bracket or other securing mechanism, thereby facilitating reliable positioning of the redirecting element in an optimal position and orientation such that parallel sunlight beams directed into the unused offset space are redirected by the redirecting structures toward the active region of the solar cells disposed on the target PV panel assembly.

According to alternative embodiments of the present invention, the redirecting element is either mounted to one of the panel assemblies or supported on the ground between the two adjacent panel assemblies. In accordance with a specific embodiment, an elongated redirecting element is connected to the backside upper edge of each PV panel assembly, and oriented to redirect sunlight onto the front surface of an adjacent PV panel assembly. In another specific embodiment, an elongated redirecting element is mounted on the lower edge of each PV panel assembly, and oriented to redirect sunlight onto the front surface of its associated PV panel assembly. Mounting the redirecting elements to the existing PV panel assembly structures allows precise permanent positioning of the elements relative to their associated solar cells, but raises stress and wind load considerations. In another specific embodiment, an elongated redirecting element is positioned on the ground between adjacent PV panel assemblies, and oriented to redirect sunlight onto the front surface of one of the PV panel assemblies. This approach eliminates stress and wind load considerations, but may obstruct the free movement of maintenance vehicles between the PV panel assemblies (unless mitigated by leaving uncovered space for tire tracks of such vehicles, or accepting the deterioration in these surface portions). In each of these embodiments, the redirecting element is fixedly positioned by the associated connection mechanism in the prismatic volume defined between adjacent PV panel assemblies, as described above, whereby each redirecting elements is oriented such that the surface is inclined at a selected angle (e.g., greater than 20° from horizontal for rainwashing purposes) and toward the target PV panel assembly (i.e., the normal of the redirecting element is leaning opposite to the target panel assembly's surface normal).

In accordance with various exemplary embodiments of the present invention, the base and optical surface regions of the redirecting elements are modified to produce a desired redirected sunlight pattern. In accordance with a first exemplary embodiment, the base is a planar substrate, and the redirecting structures are oriented identically and disposed on the planar substrate such that the redirected sunlight is directed along substantially identical diverging paths having substantially parallel nominal directions toward the target surface. In an alternative specific embodiments, the redirecting structures are oriented such that the redirected sunlight is directed along substantially identical diverging paths whose nominal directions are fanned out to cover a broad area. Such fanning out of the redirected sunlight may be achieved by orienting the redirecting structures identically on a flexible film that is then mounted on curved substrate. Alternatively, such fanning out may be achieved at level of the microoptical element's geometry by varying the shape parameters of the corresponding optical surface regions of each the redirecting structure to provide the desired deviation. Those skilled in the art will recognize the benefits and drawbacks associated with each of the delineated approaches, and will understand that alternative methods may be utilizes to achieve the desired redirected sunlight pattern.

In accordance with various exemplary specific embodiments of the present invention, the redirecting and scattering function of each redirecting structure is achieved using at least two optical surfaces formed to implement an optical technology selected from refractive/reflective microoptics, light scattering optics, diffractive optics, holographic optics, gradient index optics, an optical system involving total internal reflection (TIR), or a combination of one or more of these optical technologies. By utilizing multiple redirecting structures, the present invention facilitates sunlight redirecting elements that redirect sunlight onto a fixed (stationary) target, even when the sunlight's incident direction changes over time.

In accordance with "focus and steer" embodiments of the present invention, each of the multiple redirecting structures of a sunlight redirecting element includes two curved optical surface regions arranged such that sunlight directed onto the first curved optical surface region is focused and redirected onto the corresponding second curved optical surface region, which then redirects the focused sunlight toward the target surface. In one specific "focus and steer" embodiment, the two curved optical surface regions are formed, for example, by applying a mirror material on curved lower surface regions of a transparent material layer (e.g., clear plastic, such as for example the acrylic material PMMA) having a light refracting planar upper surface, whereby each redirecting structure is formed by two corresponding curved reflective (mirror) surfaces arranged such that sunlight directed onto the first curved reflective surface is reflected and focused directly onto the second curved reflective surface. In a second specific "focus and steer" embodiment, the sunlight redirecting element includes a transparent material layer having a lower surface formed with an upward-facing planar mirror, and multiple parallel, parabolic cylinder (or similar elongated curved) upper surface sections, whereby each redirecting structure is formed by two adjacent upper surface sections that serve to refract and focus incident sunlight such that sunlight directed onto the first curved refractive surface is refracted and directed in a converging pattern onto the upward-facing planar mirror, and then reflected from the upward-facing planar mirror such that the still-converging sunlight is focused onto the second curved refractive surface. By properly shaping the first and second curved refractive surfaces, the redirected sunlight passing through the second curved refractive surface is directed in a predetermine direction, even when the incident direction of the sunlight changes over time. Thus, a benefit of the focus and steer arrangement described herein is the higher level of control that can be kept over the outgoing angular intensity distribution (i.e. compared to the strong broadening incurred in approaches using scattering elements, such as that used in the "reorient and scatter" approach, described below). This allows the focus and steer arrangement to redirect a larger fraction of the intercepted light towards the target surface. Furthermore, the manufacturing is easier, since there is no patterning of different surface types required on the same side of the substrate; instead, it is sufficient to provide a microoptical topography covering the front surface and covering the entire back surface with a reflective coating (e.g. such as a metallization, a classic thin film reflector or a polymeric Bragg type reflector).

In accordance with "reorient and scatter" embodiments of the present invention, each of the multiple redirecting structure of a sunlight redirecting element includes two planar optical surface regions arranged in a sawtooth pattern such that the two associated planar optical surface regions generally face each other, where one of the two planar optical surface regions is a reflective surface, and the other planar optical surface regions is a light scattering surface, and where each redirecting structure is arranged such that sunlight directed onto the first planar reflective surface region is reflected onto the corresponding planar scattering surface region. With this arrangement, the redirected sunlight from the scattering surface can be directed in a predetermined, substantially fixed (unchanging) direction, even when the incident direction of the sunlight changes over time. It should be noted that the directional distribution of the outgoing light is only weakly dependent on the direction of initial sunlight incidence after the scattering event. Comparing the described "reorient and scatter" arrangement with a planar simple Lambertian scattering surface, the (also Lambertian) scatterer utilized in the "reorient and scatter" arrangement is oriented in a direction that allows the strong normal portions of its intensity distribution to be coupled to the target surface.

According to another embodiment of the present invention, a modified fixed-tilt PV farm includes a stationary sunlight redirecting system according to any of the specific embodiments described above in fixed relation to PV panel assemblies that are arranged in an otherwise conventional manner.

BRIEF DESCRIPTION OF THE DRAWINGS

These and other features, aspects and advantages of the present invention will become better understood with regard to the following description, appended claims, and accompanying drawings, where:

FIG. 6 is a partial perspective view showing a "reorient and scatter" type sunlight redirecting element according to a first specific embodiment of the present invention;

FIGS. 7(A) and 7(B) are cross-sectional side views showing the sunlight redirecting element of FIG. 6 during operation;

FIG. 8 is a partial perspective view showing another "reorient and scatter" sunlight redirecting element according to a second specific embodiment of the present invention;

FIGS. 9(A) and 9(B) are cross-sectional side views showing the sunlight redirecting element of FIG. 8 during operation;

DETAILED DESCRIPTION OF THE DRAWINGS

The present invention relates to low-cost stationary sunlight redirecting systems for improving the efficiency of fixed-tilt PV farms, and to fixed-tilt PV farms modified to include these low-cost stationary sunlight redirecting systems. The following description is presented to enable one of ordinary skill in the art to make and use the invention as provided in the context of a particular application and its requirements. As used herein, directional terms such as "upper", "upward", "lower", "downward", "front", "rear", "horizontal" and "vertical" are intended to provide relative position and orientations for purposes of description, and are not intended to designate an absolute frame of reference. In addition, the phrases "integrally connected" and "integrally molded" is used herein to describe the connective relationship between two portions of a single molded or machined structure, and are distinguished from the terms "connected" or "coupled" (without the modifier "integrally"), which indicates two separate structures that are joined by way of, for example, adhesive, fastener, clip, or movable joint. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
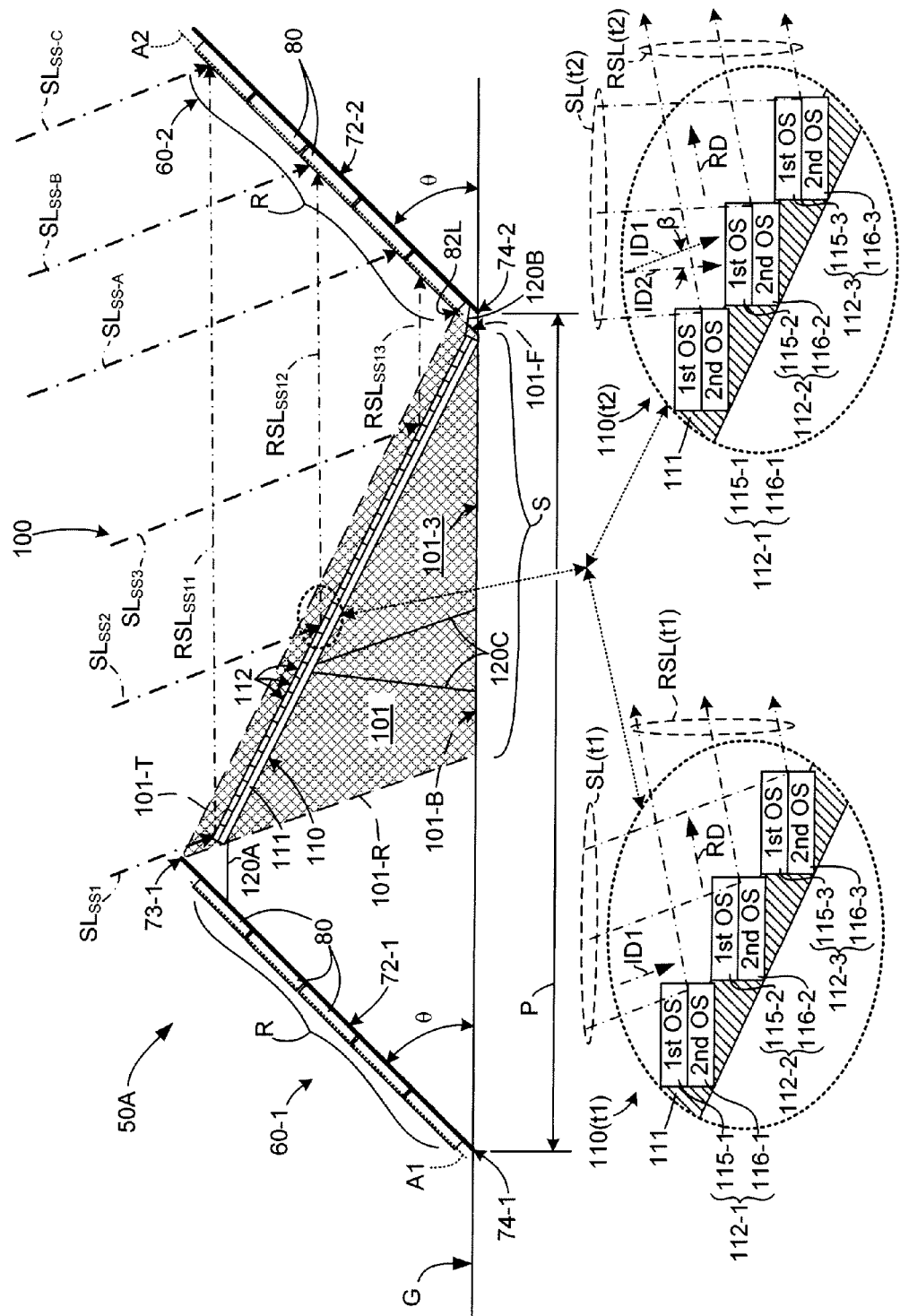
FIG. 1 is a simplified side view showing a portion of a fixed-tilt PV farm including a low-cost stationary sunlight redirecting system having sunlight redirecting elements disposed in accordance with a generalized embodiment of the present invention.

FIG. 1 is a simplified side view showing a portion of a flat panel, fixed-tilt PV farm 50A that is modified to include a low-cost stationary sunlight redirecting system 100 according to a generalized embodiment of the present invention.

Similar to conventional fixed-tilt PV farms, fixed-tilt PV farm 50A includes multiple PV panel assemblies that maintain flat-panel solar PV modules in an inclined angle relative to level ground in order to maximize the capture of sunlight. FIG. 1 shows two such PV panel assemblies 60-1 and 60-2, each including multiple flat panel solar cells 80 that are arranged in a substantially planar array and are maintained in a desired "fixed-tilt" arrangement by a corresponding support structure. For example, PV panel assembly 60-1 includes multiple solar cells 80 that are supported by a panel support structure 72-1 in a substantially planar array A1 between an upper horizontal edge 73-1 and a corresponding lower horizontal edge 74-1, wherein panel support structure 72-1 is maintained in an inclined angle θ relative to level ground G by an associated base or other support mechanism (not shown) substantially identical to that used in conventional arrangements. Similarly, PV panel assembly 60-2 includes multiple solar cells 80 that are maintained in a substantially planar array A2 and form an associated active surface R that is fixedly held at inclined angle θ relative to level ground G by a panel support structure 72-2. As indicated at the right side of FIG. 1, inclined angle θ is selected such that sunlight beams $SL_{SS-A}$, $SL_{SS-B}$ and $SL_{SS-C}$, which are generated, for example, at the time of a summer solstice, are directly received by active surface R of PV panel assembly 60-2. Typical values for inclined (tilt) angle θ are in the range of 0.7 to 1.0 times the latitude at which PV farm 50A is installed.

Also similar to conventional fixed-tilt PV farms, the predetermined pitch (spacing) P between adjacent PV panel assemblies 60-1 and 60-2 of PV farm 50A is selected according to the latitude of installation and selected inclined angle θ to optimize the total amount of sunlight intercepted during each year by solar cells 80. That is, pitch P is set such that solar cells 80 of PV panel assembly 60-2 are not shaded by PV panel assembly 60-1 during the winter solstice of each year. As indicated in FIG. 1, this arrangement produces an offset space S separating adjacent PV panel assemblies 60-1 and 60-2 such that, e.g., at the time of summer solstice, sunlight beams $SL_{SS1}$, $SL_{SS2}$ and $SL_{SS3}$ are directed into offset space S. As described in further detail below, in the absence of redirecting element 110 according to the present invention, sunlight beams $SL_{SS1}$, $SL_{SS2}$ and $SL_{SS3}$ are otherwise "wasted" because they strike the ground between solar cells 80 of adjacent PV panel assemblies 60-1 and 60-2, and are therefore not converted to electricity. The present invention is most effectively utilized at latitudes in the range of 23 and 67 degrees (north or south), where relatively large required offset spacing S between adjacent fixed-tilt panel assemblies 60-1 and 60-2 provides significant otherwise "wasted" sunlight during the summer months.

According to the present invention, low-cost stationary sunlight redirecting system 100 includes a sunlight redirecting element 110 that is fixedly secured in offset space S between adjacent PV panel assemblies 60-1 and 60-2, where redirecting element 110 redirects at least a portion of the otherwise "wasted" sunlight onto PV panel assembly 60-2 in a substantially homogenous pattern (i.e., such that all solar cells 80 receive substantially the same amount of redirected sunlight). By redirecting at least a portion of the otherwise "wasted" sunlight entering offset space S during at least a portion of the year (e.g., at least in summer), the present invention serves to increase the efficiency of a fixed-tilt, flat panel PV farm 50A on an annual basis by 5 to 10% or more.

According to an embodiment of the present invention, sunlight redirecting element 110 includes a base substrate 111 and multiple identical redirecting structures 112 that are uniformly arranged and fixedly disposed on base 111, where each redirecting structure 112 includes multiple corresponding optical surface regions that are cooperatively formed and arranged such that sunlight directed onto each redirecting structure 112 is transmitted between the corresponding optical surface regions and redirected toward active region R of PV panel assembly 60-2. For example, as indicated in the dashed bubbles at the lower portion of FIG. 1, a central region of sunlight redirecting element 110 includes redirecting structures 112-1, 112-2, and 112-3 uniformly arranged and fixedly disposed on base 111. Each redirecting structure 112-1, 112-2, and 112-3 includes at least two associated optical surface regions, which are indicated in a simplified block form in FIG. 1. For example, redirecting structure 112-1 includes a first optical surface (1st OS) region 115-1 and an associated second optical surface (2nd OS) region 116-1, redirecting structure 112-2 includes a first optical surface region 115-2 and an associated second optical surface region 116-2, and redirecting structure 112-3 includes a first optical surface region 115-3 and an associated second optical surface (2nd OS) region 116-3. As depicted by the dashed-line arrows, sunlight SL(t1) directed onto redirecting structure 112-1 interacts with both first optical surface region 115-2 and second optical surface region 116-2 before the redirected sunlight RSL(t2) is directed away from redirecting structure 112-1. Similarly, sunlight SL(t1) directed onto redirecting structures 112-2 and 112-3 interacts with both first optical surface regions 115-2/115-3 and second optical surface regions 116-2/116-3.

According to another aspect of the invention, each redirecting element 110 is constructed such that the redirected sunlight's angular distribution in the zenith plane is substantially independent of the direction of the incoming sunlight, and such that in yearly aggregate the redirecting element 110 redirects 1.3 times more sunlight onto the solar cells than a perfect Lambertian scatterer of the same area. In particular, each associated pair of optical surface regions of each redirecting structures 112 are cooperatively formed and arranged such that, when sunlight redirecting element 110 is operably fixedly oriented relative to target surface R with sunlight directed along an incident direction onto the redirecting structures 112 (e.g., as shown in FIG. 1), at least some of the sunlight is transmitted between the corresponding optical surface regions of each redirecting structure 112, and redirected from the corresponding optical surface regions toward the target surface in a predetermined, substantially fixed direction, even when the incident direction of the sunlight changes over time. For example, as indicted in the bubble located at the lower left portion of FIG. 1, at a first time t1 (e.g., during a winter month) when sunlight SL(t1) is directed along a relatively shallow incident direction ID1 onto redirecting structure 112-1, the sunlight is transmitted (e.g., reflected, refracted or otherwise redirected) between first optical surface region 115-1 and second optical surface region 116-1, and the redirected sunlight RL(t1) is directed away from redirecting structure 112-1 toward the target surface along a second direction RD. It is understood that, in the process of 'stabilizing redirection', the well collimated incident sunlight is typically broadened significantly and the second (redirection) direction denotes the centroid or similar bundle characteristic. Similarly, parallel sunlight beams sunlight SL(t1) directed onto redirecting structures 112-2 and 112-3 are transmitted between associated optical surface regions 115-2/116-2 and 115-3/116-3, and are redirected toward the target surface substantially along second direction RD. In contrast, as indicted in the bubble located at the lower right portion of FIG. 1, at a second time t2 (e.g., during a summer month) when sunlight SL(t2) is directed along a relatively steep incident direction ID2 onto redirecting structure 112-1, the sunlight is transmitted (e.g., reflected, refracted or otherwise redirected) between first optical surface region 115-1 and second optical surface region 116-1, and the redirected sunlight RL(t2) is directed away from redirecting structure 112-1 toward the target surface along second direction RD, which is substantially the same as that of the redirected sunlight at time t1. Similarly, parallel sunlight beams sunlight SL(t2) directed onto redirecting structures 112-2 and 112-3 are transmitted between associated optical surface regions 115-2/116-2 and 115-3/116-3, and are redirected along second direction RD. By utilizing multiple substantially identical redirecting structures (e.g., 112-1, 112-2 and 112-3), where each redirecting structure includes multiple optical surface regions (e.g., associated optical surface regions 115-1/116-1, 115-2/116-2 and 115-3/116-3) that are cooperatively formed and arranged, for example, in the manner set forth in the specific examples described below, the present invention provides a low-cost, stationary sunlight redirecting element that can continue to redirect sunlight onto stationary active surface R and preserve substantial homogeneity over that surface even when the sunlight's incident direction changes over time (e.g., one month or longer, or, as shown in the lower right bubble of FIG. 1, by a predetermined incident angle change β between incident directions ID1 and ID2. The term "substantially identical" indicates that redirecting elements are shaped and sized either the same similarly, but may differ gradually across the width of redirecting element 110 to enhance homogeneity. In this way, by modifying existing fixed-tilt PV farms located the above mentioned latitudes to include low-cost stationary sunlight redirecting system 100, the present invention facilitates increased electricity production through more efficient utilization of available sunlight over a large portion of each year.

According to another aspect of the present invention, redirecting element 110 is located in a prismatic "design space" volume 101 defined at its upper end by an inclined upper plane 101-T that extends across offset space S separating adjacent PV panel assemblies 60-1 and 60-2 (i.e., a plane extending between upper edge 73-1 of PV panel assembly 60-1 and a lower edge 74-2 of PV panel assembly 60-2). By positioning redirecting element 110 below inclined upper plane 101-T, undesirable shading of PV panel assembly 60-2 during winter months, when the incident sunlight is received at a shallow angle, is prevented. In one embodiment prismatic volume 101 is further bounded by a front plane 101-F, a rear plane 101-R, and the ground surface disposed between PV panel assemblies 60-1 and 60-2. Front plane 101-F extends between ground G and a lower edge 82L of the solar cells 80 mounted on PV panel assembly 60-2, and is inclined at an angle defined by plane A2. Positioning redirecting element 110 behind front plane 101-F facilitates redirection of sunlight onto active region R of PV panel assembly 60-2 at an effective angle. Rear plane 101-R extends between ground G and upper edge 73-1 of PV panel assembly 60-1, and is inclined at an angle defined by the expected sunlight direction at noon on the summer solstice. Locating redirecting element 110 in front of rear plane 101-R facilitates directing sunlight onto the (i.e., locating element 110 behind rear plane 101-R would prevent element 110 from receiving direct sunlight, even in summer). In one specific embodiment, redirecting element 110 is positioned within an associated prismatic volume 101 such that the redirecting element 110 receives and redirects sunlight during 70% of the year.

According to yet another aspect of the present invention, redirecting element 110 remains fixed relative to target PV panel assembly 60-2 at all times by way of a bracket or other securing mechanism. For example, as indicated in simplified form in FIG. 1 and discussed in further detail below, such securing mechanisms include at lease one of a bracket 120A that secures redirecting element 110 to an upper portion of PV panel assembly 60-1, a bracket 120B that secures redirecting element 110 to a lower portion of PV panel assembly 60-2, and a platform 120C that supports redirecting element 110 on ground G between PV panel assemblies 60-1 and 60-2. By providing such a securing mechanism, redirecting element 110 is reliably and optimally positioned and oriented such that parallel sunlight directed into offset space S is redirected by redirecting structures 112 toward the active region R of target PV panel assembly 60-2.

Figure 2:
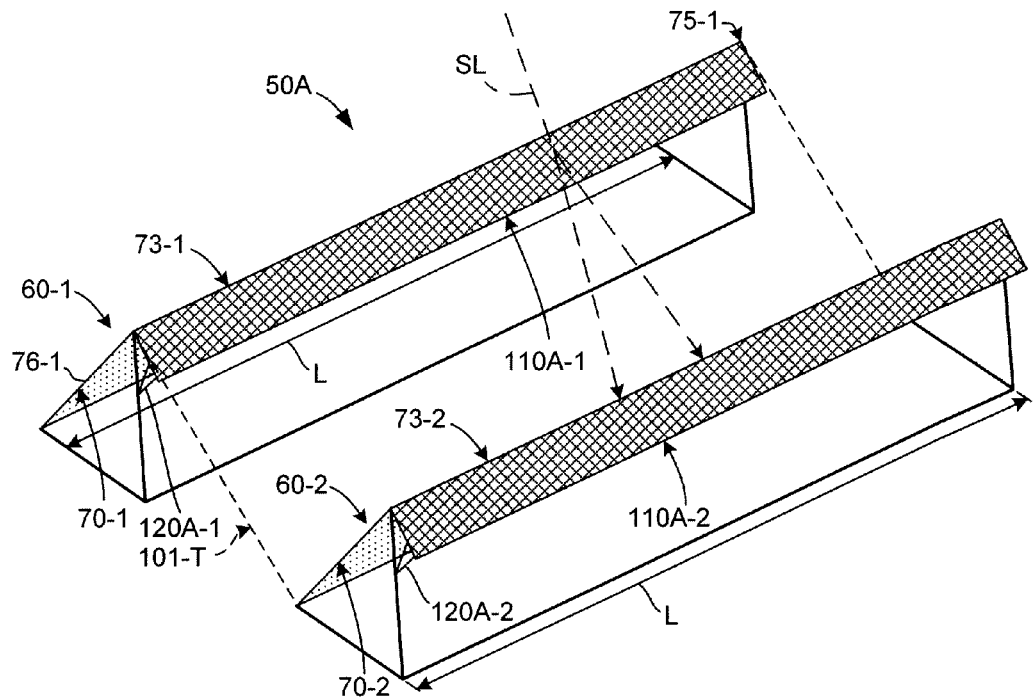
FIG. 2 is a top rear perspective view showing a portion of a fixed-tilt PV farm in which sunlight redirecting elements are disposed in accordance with a first specific embodiment of the present invention.
Figure 3:
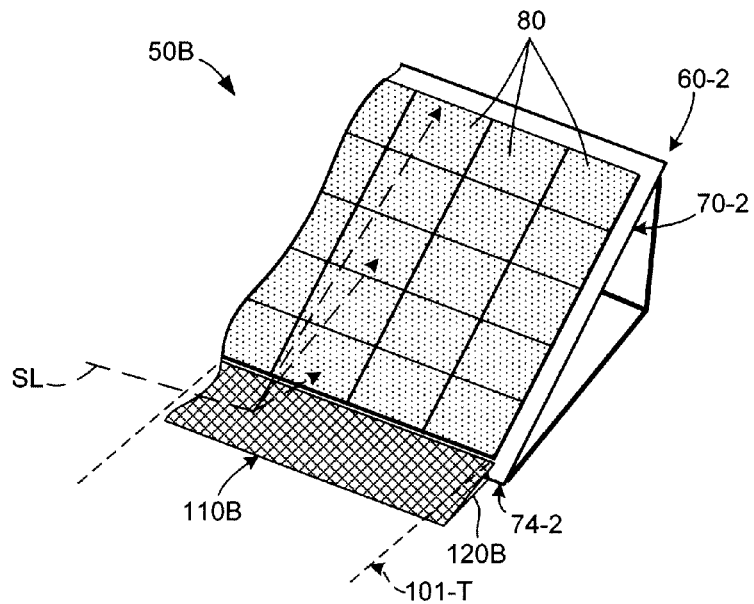
FIG. 3 is a partial top front perspective view showing a portion of a fixed-tilt PV farm in which sunlight redirecting elements are disposed in accordance with a second specific embodiment of the present invention.
Figure 4:
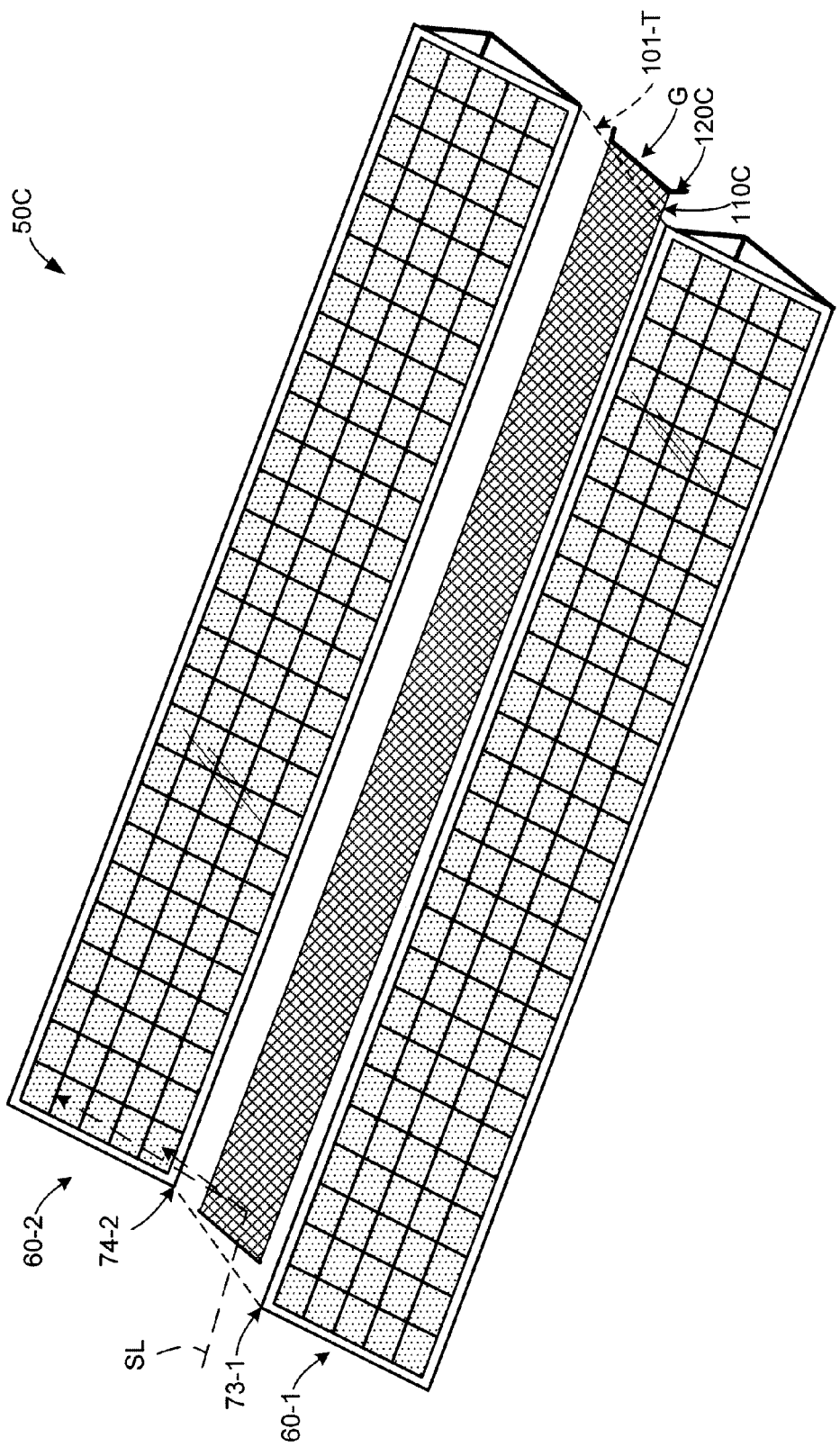
FIG. 4 is a top front perspective view showing a portion of a fixed-tilt PV farm in which sunlight redirecting elements are disposed in accordance with a third specific embodiment of the present invention.

FIGS. 2-4 illustrate simplified arrangements showing redirecting element 110 (described above) mounted between solar panel assemblies 60-1 and 60-2 according to alternative embodiments of the present invention. These simplified arrangements are intended to be exemplary and not limiting unless otherwise specified in the appended claims.

FIG. 2 is a top rear perspective view showing a portion of fixed-tilt PV farm 50A in which sunlight redirecting elements 110A-1 and 110-2 are connected to the backside upper edge of each PV panel assembly 60-1 and 60-2, respectively, in accordance with a first specific embodiment of the present invention. In the present embodiment, sunlight redirecting elements 110A-1 and 110-2 are fixedly attached (secured) by brackets 120A-1 and 120A-2 onto PV panel assemblies 60-1 and 60-2 such that redirecting elements 110A extend at a downward angle from upper horizontal edges 73-1 and 73-2, respectively, such that each sunlight redirecting elements 110A-1 and 110-2 is positioned in an associated prismatic volume in the manner described above. For example, sunlight redirecting element 110A-1 is attached by bracket 120A-1 to upper horizontal edges 73-1 of PV panel assembly 60-1, and extends into the prismatic volume disposed between PV panel assemblies 60-1 and 60-2 and defined at its upper edge by upper plane 101-T. The benefit of this arrangement is that sunlight redirecting element 110A-1 is positioned away from the ground at all times, which reduces dust collection and corrosion due to persistent moisture, but this arrangement possible raises stress and wind load considerations.

According to an aspect of the invention, each sunlight redirecting element is substantially equal in length (in a direction along the rows) to its target PV panel assembly. In some cases where access requirements do not present challenges, the redirecting surface may extend a limited distance beyond the row of solar panels. This can be useful in some cases to mitigate row end effects. This is a special case of the strategy of providing a larger area of redirecting elements per area of PV panels towards row ends to mitigate row end effects. For example, as shown in FIG. 2, panel assembly 60-1 and panel assembly 60-2 have a common length L (e.g., measured between side edges 75-1 and 76-1 of PV panel assembly 60-1), and each sunlight redirecting element 110A-1 and 110A-2 extends along the entire length L. By providing elongated sunlight redirecting elements that extend substantially along the entire length of the target PV panel assemblies, this arrangement maximizes the amount of sunlight energy redirected from each sunlight redirecting element (e.g., redirecting element 110A-1) to its target PV panel assembly (e.g., PV panel assembly 60-2). Note that the depicted length L which is purposefully made short for illustrative purposes, and that actual PV panel assemblies typically have lengths L that are longer than that depicted in FIG. 2.

FIG. 3 is a partial top front perspective view showing a portion of fixed-tilt PV farm 50B in which a sunlight redirecting element 110B is connected to the frontside lower edge 74-2 of target PV panel assembly 60-2 by way of a bracket 120C in accordance with a second specific embodiment of the present invention. As in the previous embodiments, sunlight redirecting element 110B is attached by bracket 120A-1 to upper horizontal edges 73-1 of PV panel assembly 60-1 such that redirecting element 110B extends into the prismatic volume defined at its upper edge by upper plane 101-T. Sunlight redirecting element 110B is fixedly maintained in a precise permanent position and orientation relative to PV panel assembly 60-2 by bracket 120A-1 such that sunlight SL directed onto sunlight redirecting element 110B is redirected onto the active (front) surface of solar cells 80 mounted on PV panel assembly 60-2. Permanently mounting the redirecting element 110B in this manner may reduce stress and wind load considerations over the embodiment described above with reference to FIG. 2, but may increase the chance of reduced performance due to dust collection.

FIG. 4 is a top front perspective view showing a portion of a fixed-tilt PV farm 50C in which sunlight redirecting elements 110C are fixedly maintained over the ground G and disposed between PV panel assemblies 60-1 and 60-2 in accordance with a third specific embodiment of the present invention. In particular, redirecting element 110C is supported over ground G by a platform 120C between PV panel assemblies 60-1 and 60-2, and maintained in an inclined orientation suitable for redirecting sunlight SL onto the front surface of target PV panel assembly 60-2. This approach eliminates stress and wind load considerations, but may obstruct the free movement of maintenance vehicles between PV panel assemblies 60-1 and 60-2 (unless mitigated by leaving uncovered space for tire tracks of such vehicles, or accepting the deterioration in these surface portions), and may increase the chance of reduced performance due to dust collection.

In each of the embodiments described above with reference to FIGS. 2-4, the redirecting element (e.g., redirecting element 110A, see FIG. 2) is fixedly positioned by an associated connection mechanism (e.g. bracket 120A, see FIG. 2) in a prismatic volume defined between adjacent PV panel assemblies. According to a preferred embodiment of the present invention, each redirecting element is oriented such that its surface is inclined at a selected angle greater than 20° from horizontal for rainwashing purposes, and inclined toward its target PV panel assembly (e.g., a direction normal to each redirecting element's reflective surface is directed opposite to a direction normal to the target panel's active surface).

Figure 5A:
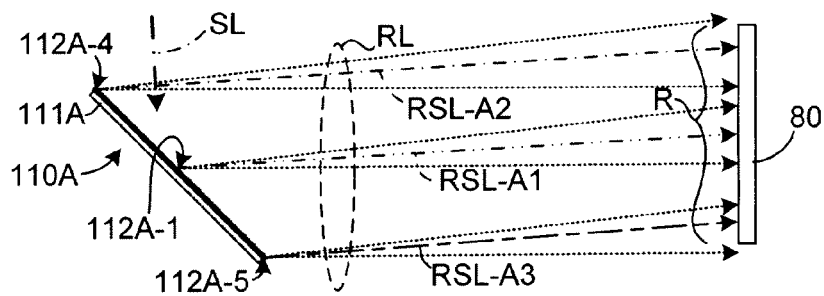
FIGS. 5(A), 5(B) and 5(C) are simplified cross-sectional side views showing various sunlight redirecting elements according to alternative embodiments of the present invention.
Figure 5B:
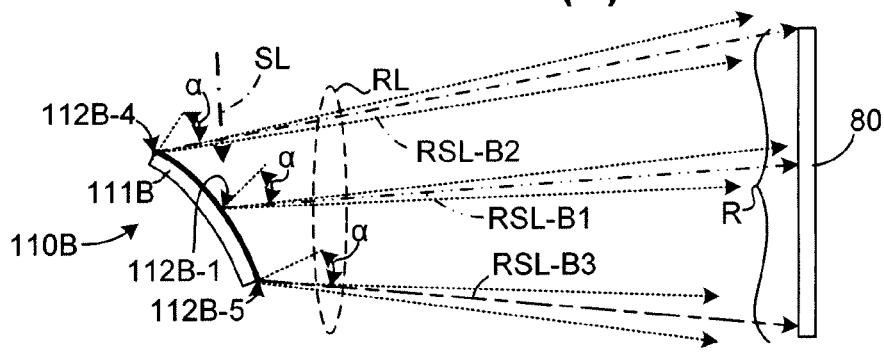
Figure 5C:
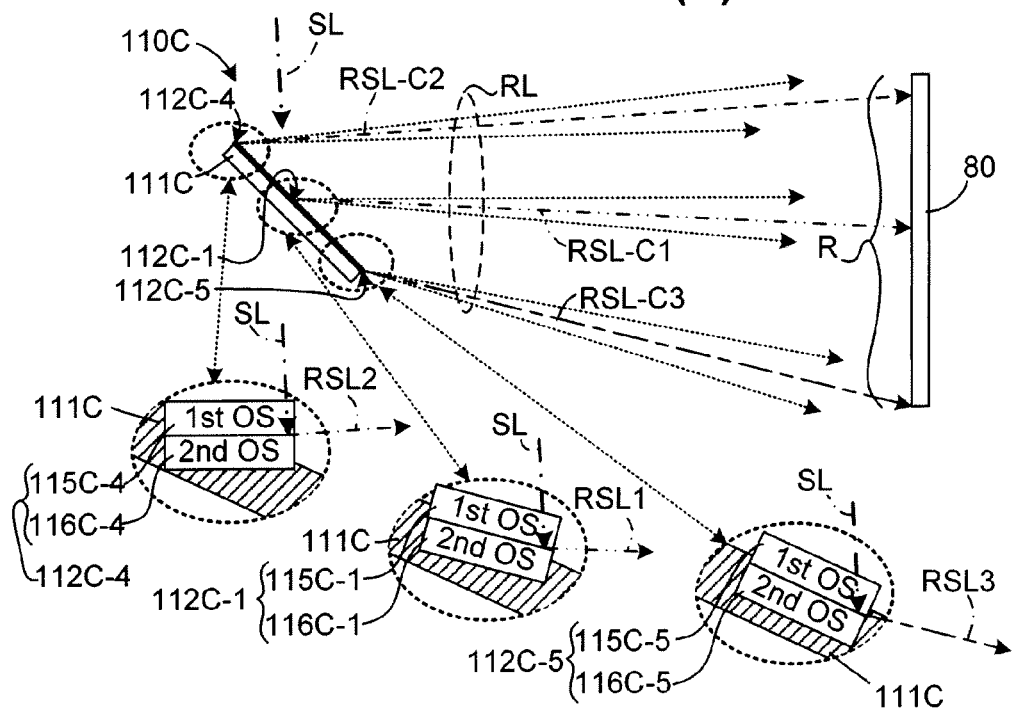

FIGS. 5(A), 5(B) and 5(C) are simplified side views illustrating alternative exemplary embodiments of the present invention, and specifically illustrate examples of how the base and redirecting structures of sunlight redirecting elements formed in accordance with the present invention may be modified to produce a desired redirected sunlight pattern.

FIG. 5(A) illustrates a first sunlight redirecting element 110A having a planar substrate base 111A, where all of the redirecting structures (e.g., central redirecting structure 112A-1 and outwardly positioned redirecting structures 112A-4 and 112A-5) are oriented identically and disposed on planar substrate base 111A such that redirected sunlight RL is directed along substantially identical divergent paths RSL-A1, RSL-A2 and RSL-A3 (indicated by dashed-line arrows), all of which having nominal directions (indicated by the central dashed-dot, dashed-dot-dot, or dash-dash-lined arrows) that are substantially parallel to common direction RD, toward PV cell 80. In particular, for a given incident direction of sunlight SL, central redirecting structure 112A-1 redirects sunlight RL along a divergent path having nominal direction RSL-A1, and outwardly positioned redirecting structures 112A-4 and 112A-5 redirect sunlight RL along divergent paths having nominal directions RSL-A2 and RSL-A3 that are parallel with nominal direction RSL-A1. A benefit of this arrangement is that a high concentration of sunlight is received by active surface R, but this arrangement requires sunlight redirecting element 110A to have a size (area) that is larger than the fanned-out embodiments shown in FIGS. 5(B) and 5(C).

FIGS. 5(B) and 5(C) illustrate alternative sunlight redirecting elements arranged such that redirected sunlight RL is directed along non-parallel nominal paths that "fan out" between the redirecting element and active surface R, thereby allowing for a relatively small redirecting element and a relatively PV cell 80, although the concentration of sunlight received by active surface R may be less than that of the previous embodiment.

FIG. 5(B) shows a sunlight redirecting element 110B that achieves a fanned-out redirected sunlight pattern by utilizing a curved (e.g., semi-cylindrical) substrate base 111B and identical redirecting structures that are oriented identically, with each redirecting structure disposed such that redirected sunlight DL is directed at an angle relative to that redirecting structures' position on curved substrate base 111B. For example, redirecting structure 112B-1 is disposed on a central (first) region of curved substrate base 111B, and redirects sunlight SL along a divergent path nominally directed at an angle α relative to a direction normal to the central region of curved substrate base 111B such that the redirected sunlight is transmitted along an associated first nominal direction RSL-B1 toward a central region of active surface R. Similarly, redirecting structure 112B-4 is disposed on an upper (second) region of curved substrate base 111B, and redirects sunlight SL along a divergent path nominally directed at angle α relative to the upper region of curved substrate base 111B along an associated second nominal direction RSL-B2 toward an upper edge of active surface R, and redirecting structure 112B-5 is disposed on an lower region of curved substrate base 111B, and redirects sunlight SL along a divergent path nominally directed at angle α relative to the lower region of curved substrate base 111B along an associated third nominal direction RSL-B3 toward a lower edge of active surface R, where second nominal direction RSL-B2 and third nominal direction RSL-B3 are "fanned out" (i.e., non-parallel) relative to first nominal direction RSL-B1. Sunlight redirecting element 110B is produced, for example, by forming the structure described above with reference to FIG. 5(A) on a flexible film that is then conformally disposed on a curved surface, which requires a two-step manufacturing process.

FIG. 5(C) shows an alternative sunlight redirecting element 110C that achieves a fanned out redirected sunlight pattern by utilizing a planar substrate base 111C and substantially identical redirecting structures that are individually oriented on base 111C to produce the desired fanned out redirected sunlight pattern. For example, redirecting structure 112C-1 is disposed on a central (first) region of planar substrate base 111C, and is oriented relative to planar substrate base 111C such that sunlight redirected by redirecting structure 112C-1 is transmitted along an associated nominal first direction RSL-C1 toward a central region of active surface R. In contrast, redirecting structure 112C-2 is disposed on an upper (second) region of planar substrate base 111C, and is oriented relative to planar substrate base 111C such that sunlight redirected by redirecting structure 112C-2 is transmitted along an associated second nominal direction RSL-C2 toward an upper region of active surface R, and redirecting structure 112C-3 is disposed on a lower region of planar substrate base 111C, and is oriented such that its associated redirected sunlight is transmitted along a third nominal direction RSL-C3 toward a lower region of active surface R, where second nominal direction RSL-C2 and third nominal direction RSL-C3 are "fanned out" relative to first nominal direction RSL-C1. Sunlight redirecting element 110C is produced, for example, by forming a stamp or roller having the desired redirecting structure pattern, which allows for a single-step manufacturing process.

Exemplary sunlight redirecting structures (redirecting elements) utilized by stationary sunlight redirecting systems of the present invention will now be described with reference to certain specific embodiments in which each redirecting element utilize at least one of a light reflecting surface, a light refracting surface, and a light scattering surface. Although the present invention is described with specific reference to embodiments utilizing these optical technologies, those skilled in the art will recognize that the redirecting and scattering function of each redirecting element may also be achieved using one or more additional optical technologies selected from diffractive optics, holographic optics, gradient index optics, an optical system involving total internal reflection (TIR), or a combination of one or more of these optical technologies. Moreover, those skilled in the art will recognize that there is active past, present and future research into tailored scattering materials (e.g. using plasmonic effects, liquid crystals, etc.), the outcomes of which may be beneficially implemented in a system as described herein.

Further, according to the alternative specific embodiments of the present invention that are disclosed below, each redirecting element includes multiple redirecting structures made up of two or more optical surface regions that are preferably produced using an existing low-cost manufacturing technique such as hot embossing or film casting, both of which have been implemented at large scales in roll to roll fashion. Each of the two or more optical surface regions is formed with multiple curved or flat reflective, refractive or light scattering optical surface segments formed in accordance with a selected light redirecting or scattering arrangement. By utilizing low-cost manufacturing techniques to produce multiple redirecting structures on the base substrate of each redirecting element, the present invention facilitates the production of low-cost sunlight redirecting elements that can continue to redirect sunlight onto a fixed target even when the sunlight's incident direction changes over time.

Moreover, the redirecting elements of each of the alternative specific embodiments disclosed below is preferably optimized for the latitude in which it is used using known techniques. Such optimization may be achieved at the level of the microoptical element's geometry by varying the shape parameters of the corresponding optical surface regions of each of the redirecting structure to deviate from the base cases provided as examples in this specification. For example, in the case of the prismatic "reorient and scatter" embodiment described below with reference to FIG. 10, the two angles assumed by each redirecting structure's optical surfaces can be adjusted to optimize each "reorient and scatter" for a given latitude (i.e., for a given range of sunlight incident angles). Preferably, this optimization is achieved by setting up the entire geometry in a ray tracing software program (such as the commercial packages Zemax, Fred, ASAP, TracePro, LightTools, etc.), using a pseudo light source formed by aggregating angular sky luminance data over a full year for the given location, and finally using the optimizers in these tools to maximize the minimum irradiance received by each target surface (e.g., the active surface of a solar cell on a PV panel). Another level of optimization is found at the macroscopic scale, where the position and angle of the arrangement surface on which the redirecting elements are placed can be optimized in a similar fashion based on the base cases delineated herein.

FIGS. 6-9 illustrate exemplary sunlight redirecting elements that utilize a "focus and steer" arrangement according to alternative specific embodiments of the present invention. As set forth below, sunlight redirecting elements formed in accordance with the "focus and steer" arrangement are characterized in that each of their redirecting structures includes at least two curved optical surface regions arranged such that sunlight directed onto one of the two curved optical surface regions is focused and redirected onto the corresponding second curved optical surface region, which then redirects the sunlight toward the active surface of a target solar cell. As set forth below, by properly shaping the two curved optical surface regions for a given latitude, the redirected sunlight reflected by the second curved reflective surface can be directed in a predetermined, substantially fixed (unchanging) direction, even when the incident direction of the sunlight changes over time. That is, the location at which the first curved reflective surface focuses the sunlight on the second curved reflective surface changes in accordance with a change in the incident sunlight direction, and the curve of the second curved reflective surface is shaped such that the redirected sunlight leaving the sunlight redirecting element is transmitted along a substantially fixed direction.

FIGS. 6, 7(A) and 7(B) illustrate a portion of a first exemplary sunlight redirecting element 100-1 including elongated redirecting structures 112-11 and 112-12 (additional redirecting structures, omitted for illustrative purposes, are disposed on the sides of redirecting structures 112-11 and 112-12). In the exemplary embodiment, each redirecting structure (e.g., redirecting structure 112-11) has a width W1 preferably in the range of 0.05 mm and 50 mm, as indicated in FIG. 6. The depicted length of each elongated redirecting structures 112-11 and 112-12 is purposefully shortened for illustrative purposes, and is preferably determined for each specific use.

According to an aspect of the present embodiment, each redirecting structure 112-11 and 112-12 includes a pair of curved reflective (mirror) surfaces that are formed, for example, in the shape of parabolic cylinder sections and are cooperatively fixedly arranged such that sunlight SL directed onto one of the curved reflective surface regions is reflected directly onto the associated second curved reflective surface region. For example, redirecting structure 112-11 includes a first curved reflective surface region 115-11 and an associated second curved reflective surface region 116-11, and redirecting structures 112-12 includes a first curved reflective surface region 115-12 and an associated second curved reflective surface region 116-12. The associated curved reflective surfaces (e.g., surface regions 115-11 and 116-11 are formed, for example, in the shape of parabolic cylinder sections that are cooperatively fixedly arranged such that sunlight SL directed onto first curved reflective surface 115-11 is reflected directly onto second curved reflective surface 116-11, as indicated in FIGS. 7(A) and 7(B) and described in additional detail below.

According to an aspect of the present embodiment, sunlight redirecting element 100-1 also includes a base 111-1 formed from a layer of transparent material layer (e.g., clear plastic, such as for example the acrylic material PMMA) having a planar upper surface 117-1 and an opposing lower surface 118-1, wherein the corresponding curved reflective surface regions of each redirecting structure are disposed on the lower surface 118-1 of base 111-1, and planar upper surface 117-1 is utilized to refract sunlight both entering and leaving base 111-1. In particular, as indicated in FIG. 6, corresponding curved reflective surface regions 115-11 and 116-11 of redirecting structure 112-11 are disposed on corresponding sections 118-115 and 118-116 of lower surface 118-1, and curved reflective surface regions 115-12 and 116-12 of redirecting structure 112-12 are disposed on corresponding sections 118-125 and 118-126 of lower surface 118-1. As shown in FIG. 7(A), sunlight SL(t1) directed along incident direction ID1 onto a region 117-1A of planar upper surface 117-1 is refracted onto curved reflective surface region 115-11, which reflects the sunlight onto a region 116-111 of second curved reflective surface region 116-11, and the sunlight that is reflected from region 116-111 of second curved reflective surface region 116-11 is directed through planar surface 117-1, which again acts to refract the sunlight into desired direction RD such that the redirected sunlight is transmitted toward the active surface (not shown). By providing base 111-1 with planar upper surface 117-1, the present embodiment facilitates low-cost maintenance in that cleaning of planar upper surface 117-1 is easily performed. The top layer may be a sandwich of one or more materials without substantially changing the described function if consistent refractive indices are chosen. This is useful if the surface layer is desired to be made of a different material (e.g. glass) than the moldable plastic material in which the optical surfaces are formed. Possible benefits are improved cleanability, UV resistance and lower perceived uncertainty in deployment.

According to another aspect of the present embodiment, the associated curved reflective surface regions of each redirecting structure are arranged such that, as the incident angle of the sun changes during at least a portion of the year, the redirected sunlight leaving the sunlight redirecting element 110-1 remains unchanged. This feature is illustrated with reference to FIGS. 7(A) and 7(B), where FIG. 7(A) shows sunlight redirecting element 110-1 at a first time t1 (e.g., during a winter month) when sunlight SL(t1) is directed along a relatively shallow incident direction ID1 onto redirecting structure 112-11, and FIG. 7(B) shows sunlight redirecting element 110-1 at a second time t2 (e.g., during a summer month) when sunlight SL(t2) is directed along a relatively steep incident direction ID2 onto redirecting structure 112-11. As described above and indicated by the dashed-lined arrows in FIG. 7(A), sunlight SL(t1) passing through region 117-1A of planar upper surface 117-1 is refracted onto curved reflective surface region 115-11, which reflects and focuses the sunlight onto region 116-111 of second curved reflective surface region 116-11, and the sunlight reflected from region 116-111 is directed back through planar surface 117-1, which refracts the sunlight into desired direction RD. By comparison, referring to the dashed-lined arrows in FIG. 7(B), sunlight SL(t2) is refracted by a region 117-1B of planar upper surface 117-1 onto curved reflective surface region 115-11, which reflects and focuses the sunlight onto region 116-112 of second curved reflective surface region 116-11. Note that, because of the steeper incident direction ID2 of sunlight SL(t2), the position of region 116-112 (e.g., the focal point of the sunlight focused by curved reflective surface region 115-11) is different from that at time t1, and the angle of second curved reflective surface region 116-11 at region 116-112 is different (e.g., shallower) than that at region 116-111. By designing second curved reflective surface region 116-11 such that sunlight reflected from either of regions 116-111 and 116-112 is directed back through planar surface 117-1 at the same angle, as illustrated by FIGS. 7(A) and 7(B), redirected sunlight RSL(t1) and redirected sunlight RSL(t2) have a common direction RD. Thus, a benefit of sunlight redirecting element 110-1 is the higher level of control that can be kept over the outgoing angular intensity distribution (i.e. compared to the strong broadening incurred in approaches using scattering elements, such as that used in the "reorient and scatter" approach, described below). This allows the focus and steer arrangement to redirect a larger fraction of the intercepted light towards the active surface of a solar cell.

According to yet another aspect of sunlight redirecting element 110-1 as illustrated in FIG. 7(A), the curved reflective surface regions of each redirecting structure 112-1 and 112-3 are formed by depositing a mirror material onto preformed curved sections of base 111-1. For example, as shown in FIG. 7(A), first curved reflective surface region 115-11 is formed by depositing a mirror material layer portion 119-115 on a corresponding curved section 118-115 of lower surface 118-1, and second curved reflective surface region 116-11 is formed by depositing a mirror material layer portion 119-116 on a corresponding curved section 118-115 of lower surface 118-1. By providing base 111-1 with a microoptical topography covering lower surface 118-1 as described above and then forming curved reflective surface regions 115-11 and 116-11 by covering the entire lower surface 118-1 with a reflective coating (e.g. such as a metallization, a classic thin film reflector or a polymeric Bragg type reflector), manufacturing process needed to form sunlight redirecting element 110-1 is greatly simplified, thereby minimizing manufacturing costs.

FIGS. 8, 9(A) and 9(B) illustrate a portion of a second exemplary sunlight redirecting element 100-2 including redirecting structures 112-21, 112-22 and 112-23 (additional redirecting structures, omitted for illustrative purposes, are disposed on the sides of these redirecting structures.

According to a first aspect of the present embodiment, sunlight redirecting element 100-2 includes a base 111-2 formed from a layer of transparent material layer (e.g., clear plastic, such as for example the acrylic material PMMA) having an upper surface 117-2 formed by parallel elongated parabolic cylindrical sections (e.g., sections 117-21, 117-22, 117-23 and 117-24) and a planar lower surface 118-2, and the corresponding curved optical surface regions of each redirecting structure are implemented by corresponding elongated parabolic cylindrical sections disposed on upper surface 117-2 of base 111-2. For example, redirecting structure 112-21 includes corresponding curved refractive surface regions 115-21 and 116-21, which are implemented by elongated parabolic cylindrical sections 117-21 and 117-22, respectively. Similarly, redirecting structure 112-22 includes corresponding curved refractive surface regions 115-22 and 116-22, which are implemented by elongated parabolic cylindrical sections 117-22 and 117-23, respectively, and redirecting structure 112-23 includes corresponding curved refractive surface regions 115-23 and 116-23, which are implemented by elongated parabolic cylindrical sections 117-23 and 117-24, respectively. As set forth below in greater detail, because redirecting structures 112-21 to 112-23 "share" parallel elongated parabolic cylindrical sections 117-21 to 117-24, sunlight redirecting element 100-2 is arranged to redirect a higher percentage of the incident sunlight toward the active surface.

According to another aspect of the present embodiment, a planar reflective surface 119-2 is disposed on lower surface 118-2 of the transparent material layer 111-2, and the associated curved optical surface regions of each redirecting structure are shaped and arranged in a manner similar to that described in the previous embodiment such that sunlight is refracted by one curved optical surface region onto planar reflective surface 119-2 such that the sunlight is reflected by planar reflective surface 119-2 and focused on a section of the corresponding second curved optical surface region. For example, as shown in FIG. 9(A), sunlight SL(t1) directed along incident direction ID1 onto first curved refractive surface region 115-21 (i.e., parallel elongated parabolic cylindrical section 117-21 of planar upper surface 117-2) is refracted onto planar reflective surface 119-2 such that the sunlight reflected from planar reflective surface 119-2 is focused onto a region 116-211 of second curved refractive surface region 116-21 (i.e., section 117-22 of planar upper surface 117-2), and the sunlight that passes through region 116-211 is directed in the desired direction RD such that the redirected sunlight is transmitted toward the active surface (not shown). By providing base 111-2 with surface 117-2, the present embodiment facilitates low-cost maintenance in that cleaning of planar upper surface 117-2 is relatively easily to perform, although more difficult than that provided by the planar upper surface of the previous embodiment.

According to another aspect of the present embodiment, the associated curved refractive surface regions of each redirecting structure are arranged such that, as the incident angle of the sun changes during at least a portion of the year, the redirected sunlight leaving the sunlight redirecting element 110-2 remains unchanged. This feature is illustrated with reference to FIGS. 9(A) and 9(B), where FIG. 9(A) shows sunlight redirecting element 110-2 at a first time t1 (e.g., during a winter month) when sunlight SL(t1) is directed along a relatively shallow incident direction ID1 onto redirecting structure 112-21, and FIG. 9(B) shows sunlight redirecting element 110-2 a second time t2 (e.g., during a summer month) when sunlight SL(t2) is directed along a relatively steep incident direction ID2 onto redirecting structure 112-21. As described above and indicated by the dashed-lined arrows in FIG. 9(A), sunlight SL(t1) passing through first curved refractive surface region 115-21 (i.e., parallel elongated parabolic cylindrical section 117-21 of planar upper surface 117-2) is refracted onto planar reflective surface 119-2, which reflects the sunlight onto region 116-211 of second curved refractive surface region 116-21, and the sunlight refracted from region 116-211 is directed into desired direction RD. By comparison, referring to the dashed-lined arrows in FIG. 9(B), sunlight SL(t2) is refracted by second curved refractive surface region 116-21 (i.e., parallel elongated parabolic cylindrical section 117-22 of planar upper surface 117-2) onto planar reflective surface 119-2, which reflects the sunlight onto region 116-212 of second curved refractive surface region 116-21. Note that, because of the steeper incident direction ID2 of sunlight SL(t2), the position of region 116-212 (e.g., the focal point of the sunlight focused by curved refractive surface region 115-21) is different from the focus point at time t1, and the angle of second curved refractive surface region 116-21 at region 116-212 is different than angle of second curved refractive surface region 116-21 at region 116-211. It is acknowledged, that the region referred to here as "focus" may be strongly blurred, e.g. due to the varying distance from the focusing elements and due to the off-axis situation. However, for this non-imaging application this will be tolerable in many cases and the light loss accepted in return for the ease of manufacture of such a solution. That is, when the reflected sunlight passes through second curved refractive surface region 116-21, refractive surface region 116-21 acts similar to a field lens: that is, it does not change the sunlight bundle's divergence (which will stay divergent, and not be collimated again to the original near parallel sunlight angular spectrum) but ensures that the bundles arising for different incidence directions are steered in substantially the same direction RD. This effect is achieved because the focus spot (e.g. regions 116-211 and 116-212) wanders around with varying angle of sunlight incidence, being subject to the locally different refractive slope found on the hit portion of the fixed lens formed by refractive surface region 116-21. In effect, a stabilization of the outgoing light is achieved, which comes at the price of broadening the angular spectrum of the originally well collimated sunlight due to the principle of Etendue conservation. This price is well acceptable in the case of a large and close target active surface, since it presents itself subtending a relatively large angle in zenith direction. Note that is possible to enhance the homogeneity of the spatial irradiance distribution on the active surface by deviating from cylindrical lenslets towards free forms, which may result from optimization for a specific spatial geometry. It should also be noted that the optimization task is an overconstrained one due to the double usage of the same lenslet surfaces as focusing lenses and field lenses, but dealing with overconstrained systems is a situation routinely encountered and mastered by those skilled in the art of computer aided optics optimization.

In the specific embodiment described above, parallel sunlight beams are described as being focused by one of the elongated curved sections (e.g., section 117-21) forming upper surface 117-2, and then reflected from planar reflective surface 119-2 back toward the elongated curved sections such that the bundles of rays come to a focus in the vicinity of an immediately adjacent curved sections (e.g., section 117-22). In an alternative embodiment the elongated curved sections and thickness of base 111-2 may be set such that the reflected light "skips" the adjacent section and possibly hits the next sections 117 (e.g., section 117-23).

Figure 10:
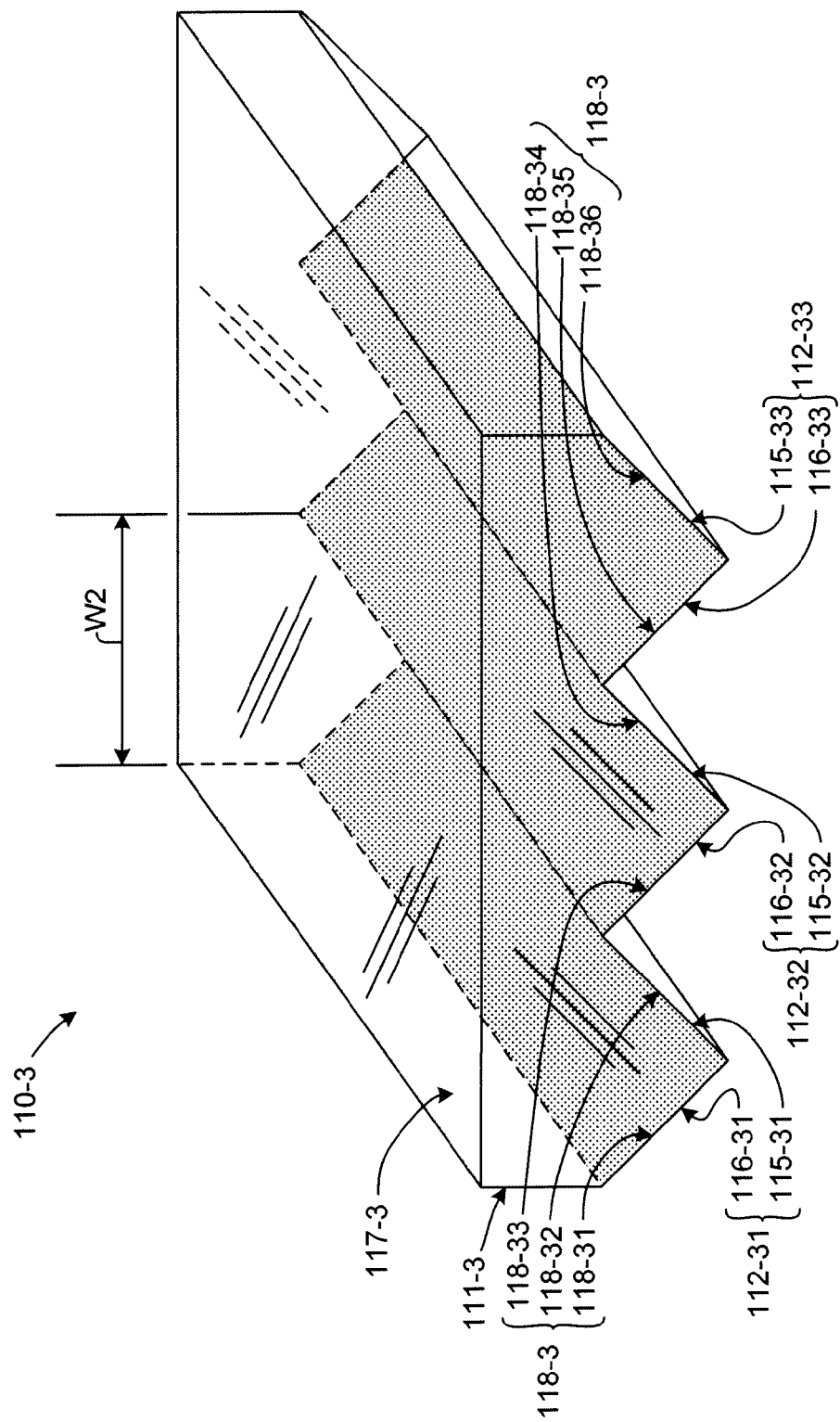
FIG. 10 is a partial perspective view showing a "reorient and scatter" type sunlight redirecting element according to a third specific embodiment of the present invention.
Figure 11A:
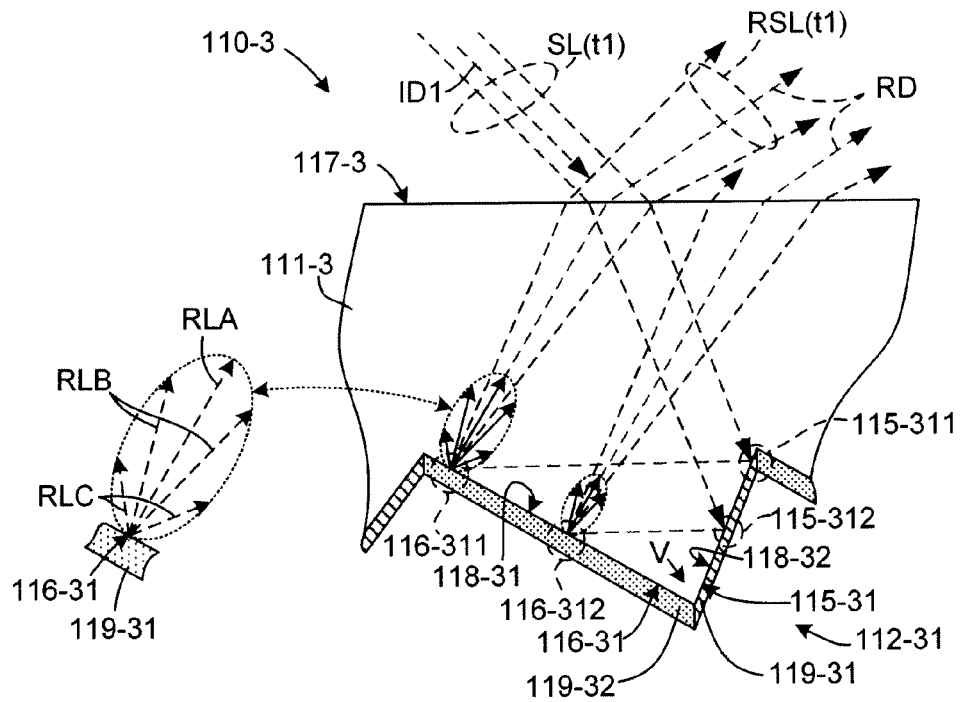
FIGS. 11(A) and 11(B) are cross-sectional side views showing the sunlight redirecting element of FIG. 10 during operation.
Figure 11B:
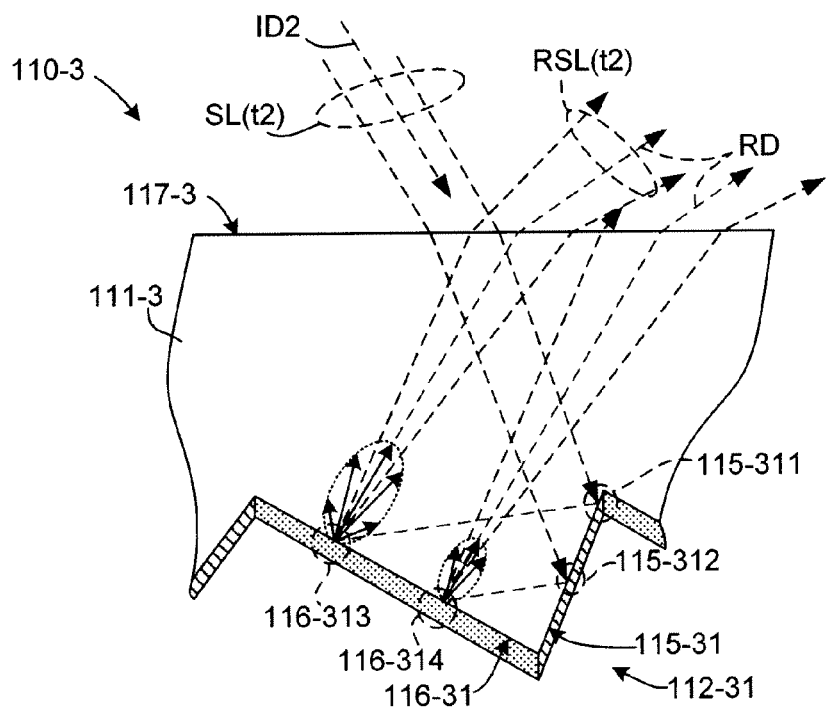
Figure 12:
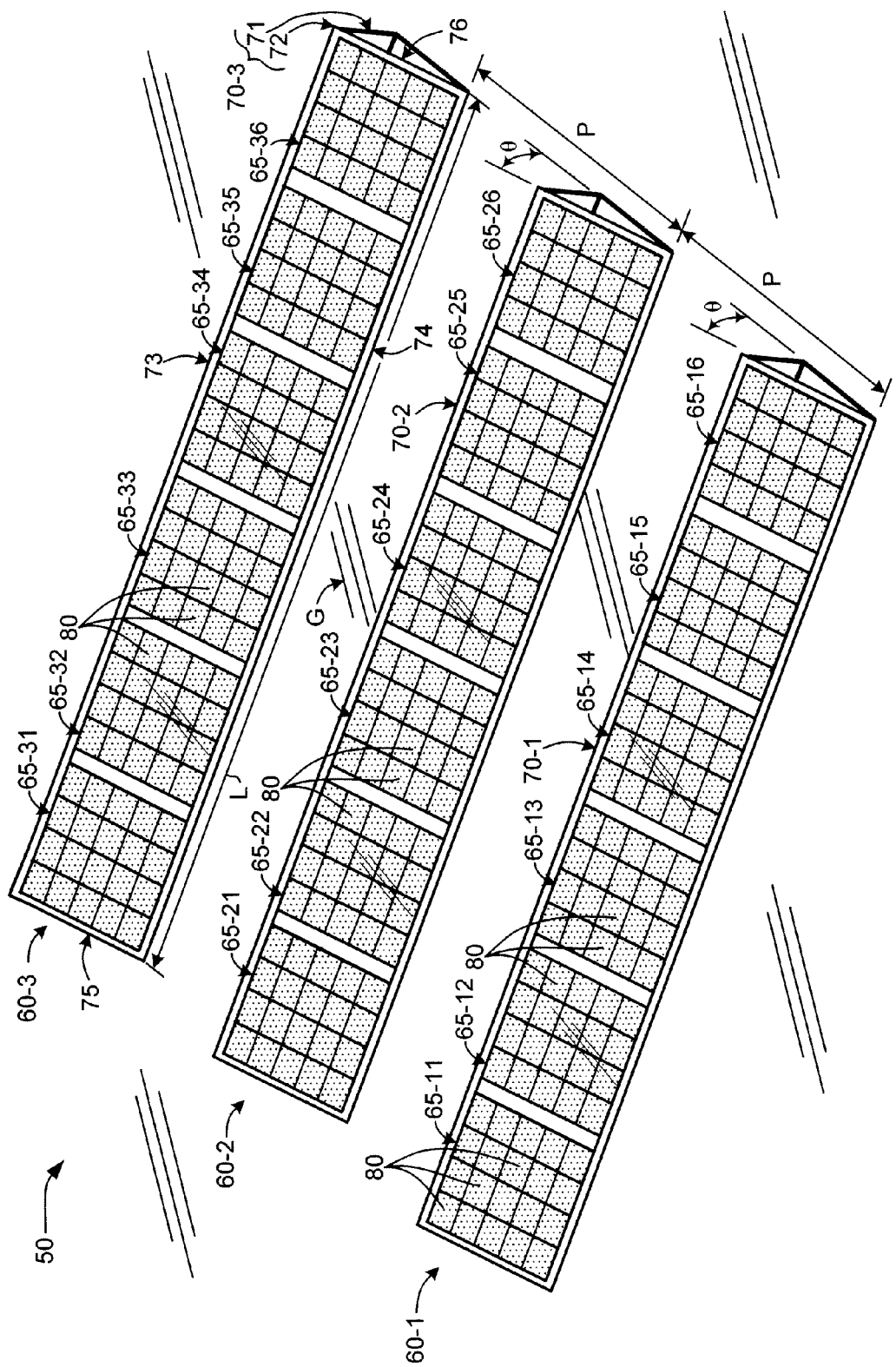
FIG. 12 is a simplified top front perspective view showing a conventional fixed-tilt PV farm.
Figure 13:
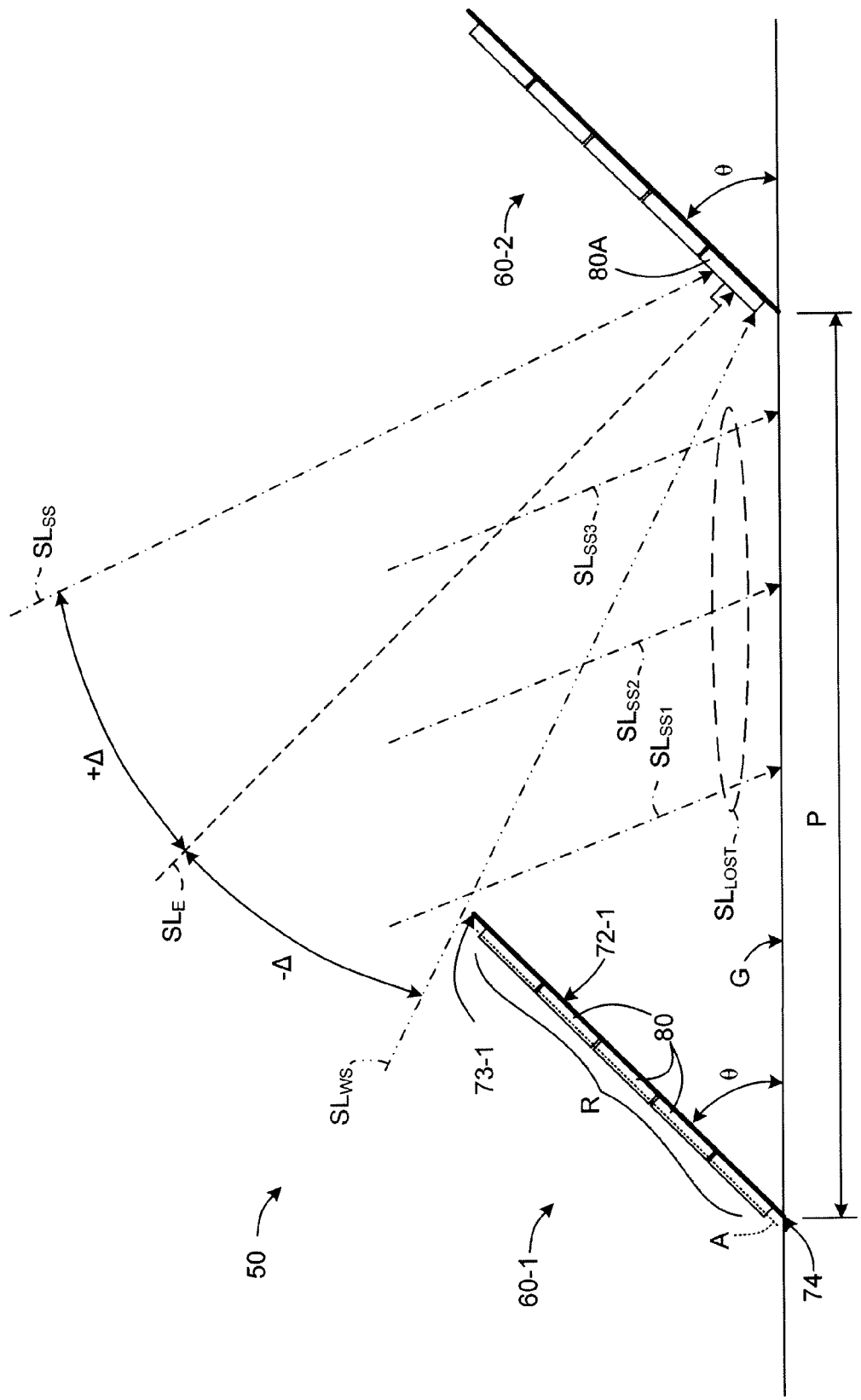
FIG. 13 is a simplified side elevation view showing a portion of the PV farm of FIG. 12.

FIGS. 10, 11(A) and 11(B) illustrate an exemplary sunlight redirecting element 100-3 that utilizes a "reorient and scatter" arrangement according to a further alternative specific embodiment of the present invention. As set forth below, sunlight redirecting elements formed in accordance with the "reorient and scatter" arrangement are characterized in that each of their redirecting structures includes at least two planar optical surface regions arranged such that sunlight directed onto one of the two planar optical surface regions is redirected (e.g. reflected) onto the corresponding second planar optical surface region, and the second planar optical surface region scatters the sunlight such that a portion of the scattered sunlight is redirected toward the target surface. This is superior to a simple scattering sheet material, since it enables orienting the scattering surface region in such a way that the peak of its angular scatter distribution points to the target (taking into account refraction on the way). As set forth below, by properly orienting the two optical surface regions for a given latitude, the redirected sunlight from the scattering surface can be directed in a predetermined, substantially fixed (unchanging) direction, even when the incident direction of the sunlight changes over time.

FIGS. 10, 11(A) and 11(B) illustrate a portion of redirecting element 100-3, which includes redirecting structures 112-31, 112-32 and 112-33 (additional redirecting structures, omitted for illustrative purposes, are disposed on the sides of redirecting structures 112-31 and 112-33). In the exemplary embodiment, each redirecting structure (e.g., redirecting structure 112-31) has a width W2 in the range of 0.01 mm and 50 mm, as indicated in FIG. 10. The depicted length of each elongated redirecting structures 112-31 to 112-33 is purposefully shortened for illustrative purposes, and is preferably determined for each specific use.

According to an aspect of the present embodiment, sunlight redirecting element 100-3 includes planar optical surface regions arranged in a sawtooth pattern such that two associated planar optical surface regions associated with each redirecting structure 112-31 to 112-33 generally face each other, where one of the two planar optical surface regions is a reflective surface, and the other planar optical surface regions is a light scattering surface, and where each redirecting structure 112-31 to 112-33 is arranged such that sunlight directed onto the reflective surface region is reflected onto the corresponding planar scattering surface region. For example, redirecting structure 112-31 includes planar reflective surface region 115-31 and planar scattering surface region 116-31, redirecting structure 112-32 includes planar reflective surface region 115-32 and planar scattering surface region 116-32, and redirecting structure 112-33 includes planar reflective surface region 115-33 and planar scattering surface region 116-33. As indicated in FIG. 11(A), the associated reflective and scattering surfaces (e.g., surface regions 115-31 and 116-31) are cooperatively fixedly arranged such that sunlight SL(t1) onto a region 115-311 of reflective surface region 115-31 is reflected onto a region 116-311 of planar scattering surface region 116-31, and sunlight SL(t1) directed onto a region 115-312 of reflective surface region 115-31 is reflected onto a region 116-312 of planar scattering surface region 116-31. As depicted by the ray diagram shown in the bubble on the left side of FIG. 11(A), light scattering surface 116-31, which is implemented in one embodiment as a white opaque surface (e.g. generated by roughening, painting, etching, embossing of fine features, etc.) generates a scattered light pattern (e.g. a Lambertian pattern) in which the highest luminous intensity of the scattered light (indicated by arrows RLA and RLB) is observed as directed normal to the planar surface forming light scattering surface 116-31. This scatter pattern occurs no matter where the sunlight strikes light scattering surface 116-31, so the sunlight is reflected in substantially the same pattern from both regions 116-311 and 116-312 of planar scattering surface region 116-31. In addition, as indicated in FIG. 11(B), the direction of the scattered light distribution is substantially the same as that at time t1 when the direction of the reflected sunlight changes. Thus, the directional distribution of the outgoing scattered light is only weakly dependent on the direction of initial sunlight incidence after the scattering event. Comparing the described "reorient and scatter" arrangement with a planar simple Lambertian scattering surface, the (also Lambertian) scatterer utilized in the "reorient and scatter" arrangement is oriented in a direction that allows the strong normal portions of its intensity distribution to be coupled to the target surface. Therefore, with the depicted "reorient and scatter" arrangement, the redirected sunlight leaving scattering surface 116-31 can be directed in a predetermined, substantially fixed (unchanging) direction, even when the incident direction of sunlight SL(t1) changes over time.

According to an aspect of the present embodiment, sunlight redirecting element 100-3 also includes a base 111-3 formed from a layer of transparent material layer (e.g., clear plastic, such as for example the acrylic material PMMA) having a planar upper surface 117-3 and an opposing lower surface 118-3 including planar surface sections 118-31 to 118-36 arranged in a sawtooth pattern, with the reflective and scattering surface regions of each redirecting structure 112-31 to 112-33 being formed by reflective/light scattering material disposed on corresponding sections of lower surface 118-3, and with planar upper surface 117-3 being utilized to refract sunlight both entering and leaving base 111-3. In particular, as indicated in FIG. 10, reflective surface region 115-31 and scattering surface region 116-31 of redirecting structure 112-31 are disposed on corresponding sections 118-32 and 118-31 of lower surface 118-3, reflective surface region 115-32 and scattering surface region 116-32 of redirecting structure 112-32 are disposed on corresponding sections 118-34 and 118-33, and reflective surface region 115-33 and scattering surface region 116-33 of redirecting structure 112-33 are disposed on corresponding sections 118-36 and 118-35. As shown in FIG. 11(A), reflective surface region 115-31 of redirecting structure 112-31 is formed by a reflective material layer 119-31 deposited or otherwise formed on section 118-32 of lower surface 118-3, and scattering surface region 116-31 of redirecting structure 112-31 is formed by a light scattering material layer 119-32 deposited or otherwise formed on section 118-31 of lower surface 118-3. Thus, each corresponding reflective/scattering surface pair of each redirecting structure 112-31 to 112-33 meets at a V-shaped seam formed by the sawtooth pattern. For example, as shown in FIG. 11(A), reflective surface region 115-31 abuts corresponding scattering surface region 116-31 at an elongated V-shaped seam (indicated by "V" in FIG. 11(A)) that is formed by sections 118-31 and 118-32 of lower surface 118-3. During operation, as shown in FIG. 11(A), sunlight SL(t1) directed along incident direction ID1 onto planar upper surface 117-3 is refracted onto reflective surface region 115-31, which reflects the sunlight onto scattering surface region 116-31, and the sunlight that is scattered by surface region 116-31 is directed through planar surface 117-3, which again acts to refract the sunlight into desired direction RD such that the redirected sunlight is transmitted toward the target surface (not shown). In some situations, there may be blocking of part of the scatter distribution by the first surface (particularly light scattered deep inside the V-groove). This undesirable side effect is mitigated to some degree by the current embodiment with a transparent material, since the refraction at the front interface results in angles in the transparent material that are closer to the front surface's normal, and therefore less affected by blocking.

According to another aspect of the present embodiment, the light scattering surface regions of each redirecting structure are arranged such that, as the incident angle of the sun changes during at least a portion of the year, the redirected/scattered sunlight distribution leaving the sunlight redirecting element 110-3 remains unchanged. This feature is illustrated with reference to FIGS. 11(A) and 11(B), where FIG. 11(A) shows sunlight redirecting element 110-3 at a first time t1 when sunlight SL(t1) is directed along incident direction ID1, and FIG. 11(B) shows sunlight redirecting element 110-3 at a second time t2 when sunlight SL(t2) is directed along a relatively steep incident direction ID2 onto redirecting structure 112-31. As described above and indicated by the dashed-lined arrows in FIG. 11(A), sunlight SL(t1) passing through planar upper surface 117-3 is refracted onto reflective surface region 115-31, which reflects the sunlight onto scattering surface region 116-31, and the sunlight scattered from surface region 116-31 is directed back through planar surface 117-3, which refracts the sunlight into desired direction RD. By comparison, referring to the dashed-lined arrows in FIG. 11(B), sunlight SL(t2) is refracted by planar upper surface 117-3 onto similar regions 115-311 and 115-312 of reflective surface region 115-31 as that shown in FIG. 11(A), but due to the steeper incident direction ID2, reflects the sunlight onto regions 116-313 and 116-314 of scattering surface region 116-31. Because of the light scattering function of scattering surface region 116-31, described above, the scattered sunlight directed away from regions 116-313 and 116-314 is directed back toward planar surface 117-3 at substantially the same angle as that shown in FIG. 11(A), and is therefore the sunlight RSL(t2) refracted by planar surface 117-3 at time t2 has substantially the same direction RD as sunlight RSL(t1) refracted by planar surface 117-3 at time t1 (see FIG. 11(A)).

Although the present invention has been described with respect to certain specific embodiments, it will be clear to those skilled in the art that the inventive features of the present invention are applicable to other embodiments as well, all of which are intended to fall within the scope of the present invention. For example, although the sunlight redirecting elements of the present invention have been described above with reference to several specific embodiments, the disclosed embodiments are intended to be exemplary and not limiting, and those skilled in the art will recognize that other existing or yet-to-be invented film generating technologies may be utilized to produce reflective/refractive surfaces that perform the sunlight scattering function described herein. As such, unless specifically limited to specific structures associated with the specific embodiments set forth above, the appended claims are not intended to be limited to the specific embodiments disclosed herein.

The invention claimed is:

1. A stationary sunlight redirecting system for increasing the efficiency of a fixed-tilt PV farm, the fixed-tilt PV farm including a plurality of PV panel assemblies, each PV panel assembly including a plurality of solar cells arranged in a substantially planar array between a corresponding upper horizontal edge and a corresponding lower horizontal edge such that the solar cells form an active region that is parallel to the substantially planar array, the planar array of the plurality of PV panel assemblies being maintained in an inclined angle relative to ground, wherein each adjacent pair of said PV panel assemblies is disposed at a predetermined spacing such that a prismatic volume is defined between each adjacent pair of said PV panel assemblies, each prismatic volume being disposed below an upper plane extending between the upper horizontal edge of a first PV panel assembly of said adjacent pair and the lower horizontal edge of a second PV panel assembly of said adjacent pair, wherein the sunlight redirecting system comprises:

a sunlight redirecting element including a base and a plurality of substantially identical redirecting structures uniformly arranged and fixedly disposed on the base, each redirecting structure including a plurality of corresponding parallel elongated optical surface regions fixedly oriented substantially parallel with the upper horizontal edge of said PV panel assembly and disposed such that sunlight is redirected along substantially identical diverging paths such that the redirected sunlight is directed away from said sunlight redirecting element in a substantially homogenous pattern; and means for securing the sunlight redirecting element in said prismatic volume between said first PV panel assembly and said second PV panel assembly such that the redirected sunlight is directed onto the active region formed by the plurality of solar cells disposed on the second PV panel assembly.

2. The stationary sunlight redirecting system according to claim 1, wherein the prismatic volume is further defined by a front plane, a rear plane, and ground disposed between the adjacent PV panel assemblies, wherein the front plane extends between ground and the lower horizontal edge of a second PV panel assembly the front plane being inclined at an angle defined by the active region of the solar cells that are mounted on the second PV panel assembly, wherein the rear plane extends between ground and the upper edge of the first panel assembly, the rear plane being inclined at an angle defined by an expected sunlight direction at noon on the summer solstice, and wherein said means for securing the sunlight redirecting element in said prismatic volume includes means for securing the sunlight redirecting element between said front and rear planes and over said ground.

3. The stationary sunlight redirecting system according to claim 1, wherein said means for securing the sunlight redirecting element includes means for securing the sunlight redirecting element in said prismatic volume such that the redirecting element receives and redirects sunlight onto the active region formed by the plurality of solar cells disposed on the second PV panel assembly during a period of at least one month.

4. The stationary sunlight redirecting system according to claim 1, wherein the second PV panel assembly has a length defined by opposing first and second side edges, and wherein the sunlight redirecting element extends substantially the entire width of the second PV panel assembly.

5. The stationary sunlight redirecting system according to claim 4, wherein said means for securing the sunlight redirecting element includes a bracket for securing the sunlight redirecting element onto the first PV panel assembly such that the redirecting element extends from the upper horizontal edge of the first PV panel assembly into the prismatic volume defined between the first and second PV panel assemblies.

6. The stationary sunlight redirecting system according to claim 4,
wherein said means for securing the sunlight redirecting element includes a bracket for securing said sunlight redirecting element onto the second PV panel assembly such that the element extends from the lower horizontal edge of the second PV panel assembly into the prismatic volume defined between the first and second PV panel assemblies.

7. The stationary sunlight redirecting system according to claim 4,
wherein said means for securing the sunlight redirecting element includes a structure for fixedly supporting said sunlight redirecting element over the ground disposed between the first PV panel assembly and the second PV panel assembly.

8. The stationary sunlight redirecting system according to claim 1, wherein the plurality of corresponding parallel elongated optical surface regions of each of the plurality of substantially identical redirecting structures comprises passive means for redirecting said sunlight such that, in yearly aggregate, the sunlight redirecting element redirects 1.3 time more sunlight onto the solar cells than a perfect Lambertian scatterer having an area equal to that of the sunlight redirecting element.

9. The stationary sunlight redirecting system according to claim 1, wherein the plurality of corresponding parallel elongated optical surface regions of each of the plurality of substantially identical redirecting structures comprises passive means for redirecting said sunlight in a direction that is substantially independent of an incident direction of the sunlight received by the sunlight redirecting element during at least one month of each year.

10. The stationary sunlight redirecting system according to claim 1, wherein said plurality of corresponding parallel elongated optical surface regions of each said redirecting structure are cooperatively formed and arranged such that, at least some of said parallel sunlight beams directed into said prismatic volume along an incident direction and onto the plurality of redirecting structures are transmitted between the plurality of corresponding parallel elongated optical surface regions of each said redirecting structure, and redirected from the plurality of corresponding parallel elongated optical surface regions toward said active region formed by the plurality of solar cells disposed on the second PV panel assembly.

11. The sunlight redirecting system of claim 10, wherein said base of the redirecting element comprises a planar substrate, and said plurality of substantially identical redirecting structures are oriented identically and disposed on the planar substrate such that said redirected sunlight is directed along said substantially identical diverging paths toward said active region.

12. The sunlight redirecting system of claim 10, wherein each of the plurality of corresponding parallel elongated optical surface regions of each redirecting structure comprises at least one of a light reflecting surface, a light refracting surface, a light scattering surface, a light diffractive surface, a holographic optical surface, and a gradient index optical surface.

13. The sunlight redirecting system of claim 10, wherein each of said plurality of parallel elongated optical surface regions of each said redirecting structure comprises a parabolic cylinder having a first curved optical surface region and a corresponding second curved optical surface region arranged such that sunlight directed onto the first curved optical surface region is redirected onto the corresponding second curved optical surface region.

14. The sunlight redirecting system of claim 13, wherein said first and second curved optical surface regions of each of said redirecting structure comprise a first curved reflective surface region and a second curved reflective surface region arranged such that sunlight directed onto the first curved reflective surface region is reflected by said first curved reflective surface region directly onto the second curved reflective surface region.

15. The sunlight redirecting system of claim 14,
wherein the base of each said sunlight redirecting element comprises a transparent material layer having a planar upper surface and an opposing lower surface, and
wherein the corresponding first and second curved reflective surface regions of each said plurality of redirecting structures are disposed on the lower surface of the transparent material layer and are arranged such that said sunlight directed along the incident direction onto an associated first region of the planar upper surface is refracted onto said first curved reflective surface region, and sunlight that is reflected by the corresponding second curved reflective surface region is directed through the planar surface to the active region.

16. The sunlight redirecting system of claim 13,
wherein each said sunlight redirecting element further comprises a transparent material layer having an upper surface, and
wherein said first curved optical surface region and said corresponding second curved optical surface region of each said sunlight redirecting element comprise respective first and second elongated parabolic cylindrical sections of the upper surface of the transparent material layer.

17. The sunlight redirecting system of claim 10,
wherein said plurality of corresponding optical surface regions of each of said redirecting elements comprises a plurality of planar optical surface regions arranged in a sawtooth pattern,
wherein each redirecting structure includes a first planar reflective surface region of said plurality of planar optical surface regions and a second planar scattering surface region of said plurality of planar optical surface regions, and
wherein said each redirecting structure is arranged such that sunlight directed onto the first planar reflective surface region is reflected onto the corresponding second planar scattering surface region.

18. A fixed-tilt PV farm comprising:
a plurality of PV panel assemblies, each PV panel assembly including a panel support structure and a plurality of solar cells arranged in a substantially planar array between an upper horizontal edge and a lower horizontal edge of the panel support structure such that the solar cells form an active region that substantially covers a surface of the panel support structure, the planar arrays of the plurality of PV panel assemblies being maintained in an inclined angle relative to ground, wherein each adjacent pair of said PV panel assemblies is disposed at a predetermined spacing such that a prismatic volume is defined between each adjacent pair of said PV panel assemblies, each prismatic volume being disposed below an upper plane extending between the upper horizontal edge of a first PV panel assembly of said adjacent pair and the lower horizontal edge of a second PV panel assembly of said adjacent pair; and a stationary sunlight redirecting system for increasing the efficiency of the fixed-tilt PV farm, the redirecting system including a sunlight redirecting element disposed in said prismatic volume between said first PV panel assembly and said second PV panel assembly such that said sunlight redirecting element remains fixed relative to the first and second PV panel assemblies, said sunlight redirecting element including a plurality of parallel elongated parabolic cylindrical optical surface regions that are oriented in parallel with the upper horizontal edge and disposed such that sunlight is redirected along substantially identical diverging paths away from said sunlight redirecting element, wherein said plurality of optical surface regions are collectively arranged such that sunlight entering said prismatic volume is redirected and distributed by said plurality of optical surface regions in a substantially homogenous pattern on the active region formed by the plurality of solar cells disposed on the second PV panel assembly.

* * * * *